United States Patent
Choi et al.

(10) Patent No.: US 10,506,556 B2
(45) Date of Patent: Dec. 10, 2019

(54) METHOD AND DEVICE FOR ALLOCATING RESOURCE UNITS IN WIRELESS LAN

(71) Applicant: LG ELECTRONICS INC., Seoul (KR)

(72) Inventors: Jinsoo Choi, Seoul (KR); Wookbong Lee, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 15/510,230

(22) PCT Filed: Sep. 14, 2015

(86) PCT No.: PCT/KR2015/009639
§ 371 (c)(1),
(2) Date: Mar. 9, 2017

(87) PCT Pub. No.: WO2016/039603
PCT Pub. Date: Mar. 17, 2016

(65) Prior Publication Data
US 2017/0289963 A1    Oct. 5, 2017

Related U.S. Application Data

(60) Provisional application No. 62/050,114, filed on Sep. 13, 2014, provisional application No. 62/050,781, (Continued)

(51) Int. Cl.
*H04W 72/04* (2009.01)
*H04W 72/12* (2009.01)
(Continued)

(52) U.S. Cl.
CPC .......... *H04W 72/04* (2013.01); *H04L 5/0007* (2013.01); *H04W 72/0453* (2013.01); *H04W 72/12* (2013.01); *H04W 84/12* (2013.01); *H04W 88/08* (2013.01)

(58) Field of Classification Search
None
See application file for complete search history.

(56) References Cited

U.S. PATENT DOCUMENTS

2011/0086645 A1    4/2011    Choi et al.
2011/0255620 A1    10/2011   Jones, IV et al.
(Continued)

FOREIGN PATENT DOCUMENTS

CN    102238732    11/2011
CN    102396186    3/2012
(Continued)

OTHER PUBLICATIONS

European Patent Office Application Serial No. 15839479.1, Search Report dated Mar. 21, 2018, 8 pages.
(Continued)

*Primary Examiner* — Donald L Mills
(74) *Attorney, Agent, or Firm* — Lee Hong Degerman Kang Waimey

(57) ABSTRACT

A method and a device for allocating resource units in a wireless LAN are disclosed. The method for allocating resource units in a wireless LAN can comprise the steps of: scheduling, by an AP, wireless resources for communicating with an STA on a bandwidth; and transmitting, by the AP, downlink data to the STA through the wireless resources, wherein the wireless resources are determined on the basis of a resource allocation combination according to the bandwidth size, and the resource allocation combination is a combination of at least one resource unit allocable on the whole available tone according to the bandwidth size, and the whole available tone can be a multiple of 242 tones according to the bandwidth size.

9 Claims, 14 Drawing Sheets

Related U.S. Application Data filed on Sep. 16, 2014, provisional application No. 62/051,861, filed on Sep. 17, 2014, provisional application No. 62/058,110, filed on Oct. 1, 2014.

(51) Int. Cl.
*H04W 84/12* (2009.01)
*H04W 88/08* (2009.01)
*H04L 5/00* (2006.01)

(56) References Cited

U.S. PATENT DOCUMENTS

| | | | | |
|---|---|---|---|---|
| 2011/0305296 A1* | 12/2011 | Van Nee | ............... | H04L 5/0053 375/295 |
| 2012/0263090 A1 | 10/2012 | Porat et al. | | |
| 2014/0003449 A1 | 1/2014 | Li | | |
| 2014/0169245 A1 | 6/2014 | Kenney et al. | | |
| 2015/0365257 A1* | 12/2015 | Suh | .......................... | H04B 7/04 375/295 |
| 2015/0365922 A1* | 12/2015 | Suh | ....................... | H04L 5/0007 370/329 |
| 2016/0050666 A1* | 2/2016 | Yang | ..................... | H04W 72/02 370/329 |
| 2016/0050672 A1* | 2/2016 | Chen | ..................... | H04W 72/06 370/329 |
| 2016/0057754 A1* | 2/2016 | Azizi | ..................... | H04W 28/20 370/329 |
| 2016/0073387 A1* | 3/2016 | Yang | ..................... | H04L 5/0048 370/329 |

FOREIGN PATENT DOCUMENTS

| | | |
|---|---|---|
| CN | 102835061 | 12/2012 |
| CN | 103621033 | 3/2014 |
| EP | 2039044 | 3/2009 |
| EP | 3217588 | 9/2017 |
| JP | 2008066778 | 3/2008 |
| JP | 2013541302 | 11/2013 |
| JP | 2017529717 | 10/2017 |
| KR | 10-0914563 | 8/2009 |
| KR | 1020130108384 | 10/2013 |
| KR | 1020140053128 | 5/2014 |
| WO | 2007149997 | 12/2007 |
| WO | 2012/051319 | 4/2012 |
| WO | 2012051319 | 4/2012 |
| WO | 2014047444 | 3/2014 |
| WO | 2015163336 | 10/2015 |

OTHER PUBLICATIONS

Stacey, R., "Specification Framework for TGax", IEEE P802.11 Wireless LANs, doc.: IEEE 802.11-15/0132r7, Jul. 2015, 13 pages.
Japan Patent Office Application No. 2017-513633, Notice of Allowance dated Jan. 4, 2018, 3 pages.
Korean Intellectual Property Office Application No. 10-2017-7006617, Notice of Allowance dated Sep. 10, 2018, 2 pages.
The State Intellectual Property Office of the People's Republic of China Application Serial No. 201580056747.1, Office Action dated Sep. 18, 2019, 8 pages.

* cited by examiner

FIG. 1
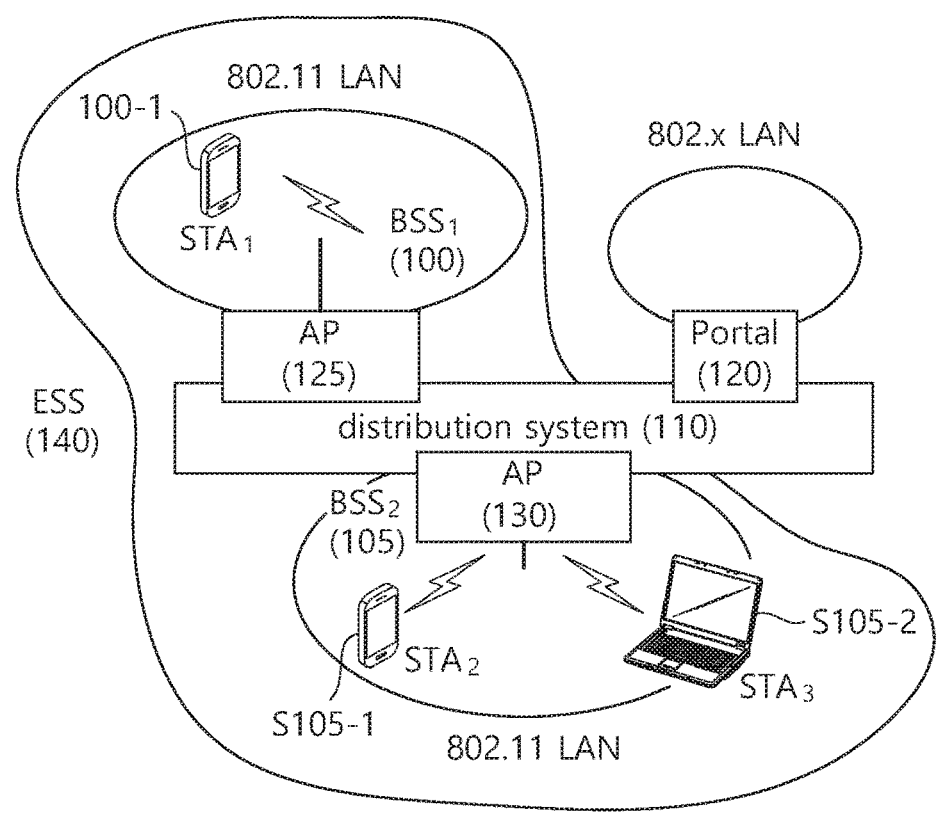
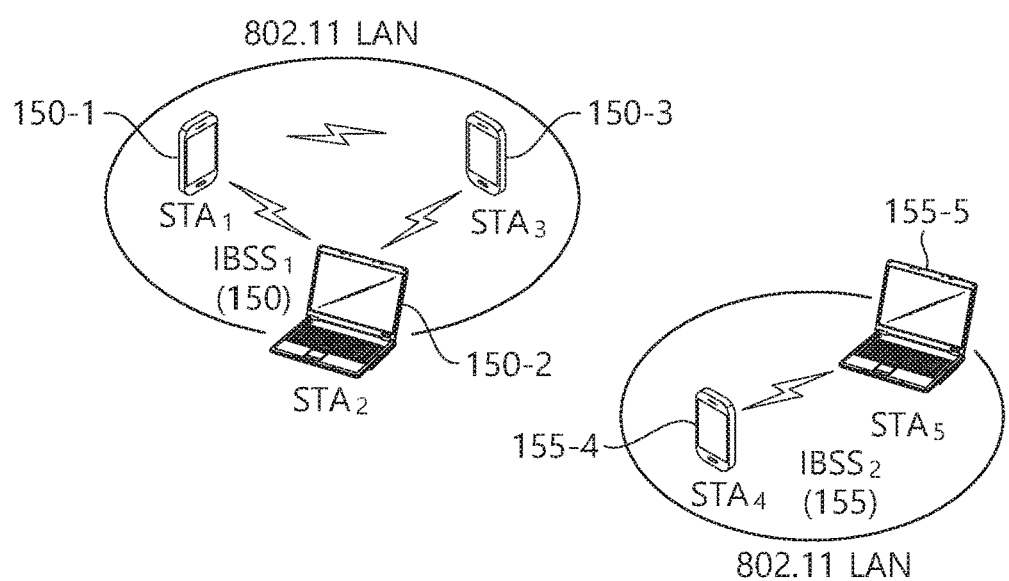

METHOD AND DEVICE FOR ALLOCATING RESOURCE UNITS IN WIRELESS LAN

CROSS-REFERENCE TO RELATED APPLICATIONS

This application is the National Stage filing under 35 U.S.C. 371 of International Application No. PCT/KR2015/009639, filed on Sep. 14, 2015, which claims the benefit of U.S. Provisional Application Nos. 62/050,114, filed on Sep. 13, 2014, 62/050,781, filed on Sep. 16, 2014, 62/051,861, filed on Sep. 17, 2014, and 62/058,110, filed on Oct. 1, 2014, the contents of which are all hereby incorporated by reference herein in their entirety.

BACKGROUND OF THE INVENTION

Field of the Invention

The present invention relates to wireless communication, and more particularly, to a method and apparatus for allocating a resource unit in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

The present invention provides a method for allocating a resource unit in a wireless LAN.

The present invention also provides an apparatus for allocating a resource unit in a wireless LAN.

Technical Solutions

In an aspect, a method for allocating a wireless resource in a wireless LAN is provided. The method includes scheduling, by an access point (AP), a wireless resource for communication with a STA (station) on a bandwidth and transmitting, by the AP, downlink (DL) data to the STA through the wireless resource, in which the wireless resource is determined based on a resource allocation combination according to a size of the bandwidth, the resource allocation combination is a combination of at least one resource unit which is allocatable on an entire available tone according to the size of the bandwidth, and the entire available tone is a multiple of 242 tones according to the size of the bandwidth.

In another aspect, an access point (AP) for allocating a wireless resource in a wireless LAN is provided. The AP includes a radio frequency (RF) unit which transmits and receives a wireless signal and a processor operatively combined with the RF unit, in which the processor is implemented to schedule a wireless resource for communication with a STA (station) on a bandwidth and transmit downlink data to the STA through the wireless resource, the wireless resource is determined based on a resource allocation combination according to the size of the bandwidth, the resource allocation combination is a combination of at least one resource unit which is allocatable on an entire available tone according to the size of the bandwidth, and the entire available tone is a multiple of 242 tones according to the size of the bandwidth.

Technical Effects

When allocating resources for each of a plurality of stations (STAs) based on orthogonal frequency division multiple access (OFDMA), since wireless (or radio) resource units that are defined to have sizes being different from one another may be allocated to each of the plurality of STAs, scheduling flexibility may be enhanced and throughput of the wireless LAN may also be increased.

BRIEF DESCRIPTION OF THE DRAWINGS

FIG. 1 is a conceptual diagram illustrating the structure of a wireless local area network (WLAN).

DESCRIPTION OF EXEMPLARY EMBODIMENTS

Figure 2:
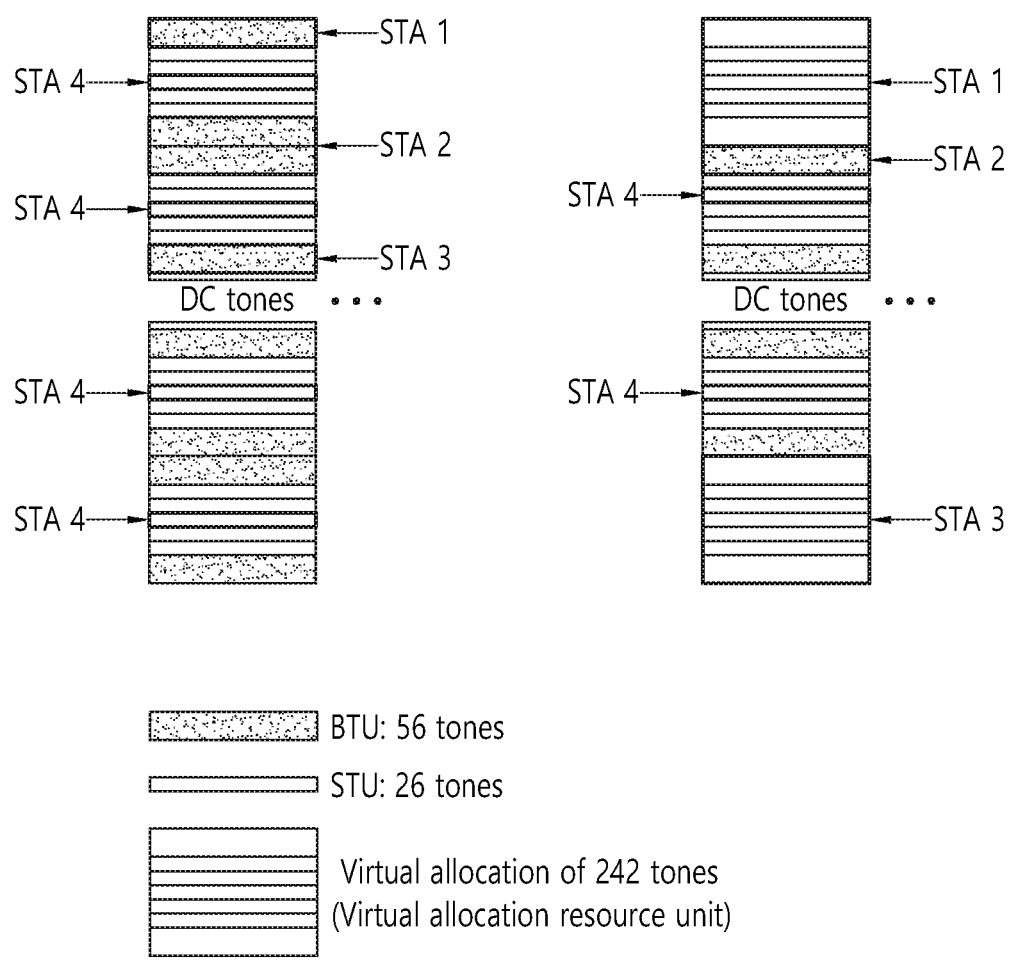
FIG. 2 is a conceptual diagram illustrating a method of allocating a resource according to an embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels)

or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the WirelessLAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256FFT/IFFT may be applied for a 20 MHz bandwidth, 512FFT/IFFT may be applied for a 40 MHz bandwidth, 1024FFT/IFFT may be applied for an 80 MHz bandwidth, and 2048FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4μs, 0.8 μs, 1.6 μs, 2.4 μs, and 3.2 μs.

When an OFDMA-based resource allocation method according to an embodiment of the present invention is used, the resource allocation unit defined by different sizes may be used. Specifically, a basic tone unit (BTU) and a small tone unit (STU) may be defined for the resource allocation based on the OFDMA.

The AP may determine DL transmission resource and/or UL transmission resource for at least one STA based on such various resource units. The AP may transmit at least one PPDU to at least one STA through the scheduled DL transmission resource. Further, the AP may receive at least one PPDU transmitted by at least one STA through the DL transmission resource.

In comparison with the STU, the BTU may be a relatively larger size resource unit. For example, the BTU may be defined as the size of 56 tones, 114 tones or the like. The BTU may be defined as the same size irrespective of the size of the available bandwidth (e.g., 20 MHz, 40 MHz, 80 MHz, 160 MHz, etc.) or defined as a size which is changed depending on the size of the available bandwidth. For example, the size of the BTU may be defined as a relatively large value as the size of the available bandwidth increases. The tone may be understood as the same as the subcarrier.

In comparison with the BTU, the STU may be a relatively small size resource unit. For example, the STU may be defined as the size of 26 tones.

Resource units such as BTU and STU may be allocated on the entire bandwidth (or available bandwidth) in consideration of the left guard tone and the right guard tone which are located at both ends of the entire bandwidth and are used to reduce interference, and the direct current (DC) tone located in the center of the entire bandwidth. Further, the resource units such as BTU and STU may be allocated in consideration of a leftover tone which may be used for user allocation separation (or resource allocation for each STA), a common pilot, an automatic gain control (AGC), a phase tracking, etc.

In the entire bandwidth, the allocation method (allocated number, allocation location, etc) of the resource units such as BTU and STU on the entire bandwidth may be set in consideration of the resource utilization efficiency and the scalability (or extensibility) according to the entire bandwidth. The allocation method of resource units such as BTU and STU may defined in advance or signaled based on various methods (e.g., a signaling based on a signal field included in the PPDU header of the PPDU).

Hereinafter, a specific resource allocation method based on BTU and STU will be described.

FIG. 2 is a conceptual diagram illustrating a method of allocating a resource according to an embodiment of the present invention.

FIG. 2 shows a method of allocating BTU and STU in consideration of the number of available tones on the entire bandwidth in order not to have a leftover tone (or a remaining tone). Further, a method of allocating a combination of at least one BTU and at least one STU to one STA based on virtual allocation is disclosed. An available tone may be a tone which is usable for resource allocation to STA except for a left guard tone, a right guard tone, a DC tone, etc.

Table 1 below discloses a method of allocating BTU and STU on the bandwidths of 20 MHz, 40 MHz, and 80 MHz.

TABLE 1

|  | 20 MHz | 40 MHz | | 80 MHz |
|---|---|---|---|---|
| Basic tone unit (BTU) | 56 tones | Opt-1: 56 tones | Opt-2: 114 tones | 114 tones |
| Small tone unit (STU) |  | 26 tones | | |
| Total # of BTUs | 2 | 4 | 3 | 6 |
| Total # of STUs | 5 | 10 | 6 | 12 |
| Total available tones except guard/DC tones | 242 tones | 484 tones | 498 tones | 996 tones |
| Possible # of BTUs allocated to a STA | 1, 2 | 1, 2[1)] | 1, 2 | 1, 2, 4 |
| Possible # of STUs allocated to a STA | 1, 2, 4, 5 | 1, 2, 4, 10 | 1, 2, 4, 6 | 1, 2, 4, 12 |
| Maximum STA # of allocations | 7 | 14 | 9 | 18 |

Referring to Table 1, when the entire bandwidth is 20 MHz, BTU may be a resource unit corresponding to 56 tones and STU may be a resource unit corresponding to 26 tones. The number of available tones except the guard tone and DC tone on 20 MHz bandwidth may be 242 tones, the total number of BTUs which may be allocated on 242 tones may be 2, and the number of the total number of STUs which may be allocated may be 5. The sum of the total tones of 2 BTUs and 5 STUs is 242. 2 BTUs and 5 STUs may be mapped to 242 tones which is the number of tones which are available on 20 MHz bandwidth without a leftover tone.

One STA may be allocated 1 or 2 BTUs and/or 1, 2, 4 or 5 STUs on 20 MHz bandwidth. Further, the resource allocation for the maximum 7 STAs (e.g., STA1: BTU1, STA1: BTU2, STA3: STU1, STA4: STU2, STA5: STA3, STA6: STU4, STA7: STU5) may be performed based on the combination of BTU and/or STU.

When the total bandwidth is 40 MHz, the BTU may be a resource unit which selectively corresponds to 56 tones or 114 tones, and the STU may be a resource unit corresponding to 26 tones.

When the BTU is 56 tones, the number of available tones except the guard tone and the DC tone on the 40 MHz bandwidth may be 484 tones which is a multiple of 242 tones. Further, when the BTU is 56 tones, the total number of BTUs which may be allocated on 484 tones may be 4, and the total number of STUs which may be allocated may be 10. The sum of total tones of 4 BTUs and 10 STUs is 484 tones. 4 BTUs and 10 STUs may correspond to 484 tones which is the number of tones which are available on 40 MHz bandwidth without a leftover tone.

When the BTU is 56 tones, one STA on 40 MHz bandwidth may be allocated 1 or 2 BTUs and/or 1, 2, 4 or 10 STUs. Further, the resource allocation for the maximum 14 STAs may be performed on the 40 MHz bandwidth based on the combination of BTU and/or STU.

When the BTU is 114 tones, the number of available tones except the guard tone and the DC tone on 40 MHz bandwidth may be 498. Further, when BTU is 114 tones, the total number of BTUs which may be allocated on 498 tones may be 3, and the total number of STUs which may be allocated on 40 MHz bandwidth may be 6. The sum of the total tones of 3 BTUs and 10 STUs is 498. 3 BTUs and 10 STUs may correspond to 498 tones which is the number of available tones on 40 MHz bandwidth without a leftover tone.

When BTU is 114 tones, one STA 1 or 2 BTUs and/or 1, 2, 4 or 6 STUs on 40 MHz. Further, the resource allocation on the maximum 9 STAs may be performed on 40 MHz bandwidth based on the combination of BTU and/or STU.

When the total bandwidth is 80 MHz, the BTU may be 114 tones and STU may be 26 tones. The number of available tones except the guard tone and the DC tone on 80 MHz bandwidth may be 996 tones, and the total number of BTUs which may be allocated on 996 tones may be 6, and the total number of STUs which may be allocated may be 12. The sum of total tones of 6 BTUs and 12 STUs is 996 tones. 6 BTUs and 12 STUs may correspond to 996 tones which is the number of available tones on 80 MHz bandwidth without a leftover tone.

One STA may be allocated 1, 2, or 4 BTUs and/or 1, 2, 4 or 12 STUs on 80 MHz bandwidth. Further, the resource allocation for the maximum 18 STAs may be performed on 80 MHz bandwidth based on the combination of BTU and/or STU.

According to an embodiment of the present invention, one STA may be allocated a total of 242 tones (=56 tones*2 BTUs+26 tones*5 STUs) corresponding to 2 BTUs and 5 STUs.

When 242 tones are allocated to one STA, the existing pilot allocation and existing interleaver size may be utilized. Specifically, the pilot tone may be allocated to 8 tones among 242 tones, and the data tone may be allocated to the remaining 234 tones. One interleaving may be performed for the data tone of 234 tones based on the interleaver of 234 size.

In such a case, the data interleaving procedure and pilot tone insertion procedure may be performed in the same manner as the STA which has been allocated the existing 242 tones. Namely, even when the 242 tone structure is not physically supported, one virtual resource tune of 242 tones may be allocated to the STA. In such a case, the interleaving procedure which utilizes the existing interleaver of 234 size and the existing pilot tone (8 pilot tones) may be used. The resource unit of 242 tones may be expressed as the term "virtual allocation resource unit". For example, the virtual allocation resource unit may be 242 tones or a multiple of 242 tones (e.g., 484, 968, etc.). Further, the size of the virtual allocation resource unit may be determined based on another interleaver size (108, 52, 24, etc.) which has been used in the existing wireless LAN system.

Likewise, information on the number of STUs (or BTUs) which may be allocated to one STA) and/or the number of STUs (or BTUs) which are allocated to one STA may be signaled by AP. STUs (or BTUs) of a number smaller than the maximum number of STUs (or BTUs) which may be allocated by one STA may be allocated, and information (number and/or allocation location) on the STU or BTU) allocated to the STA may be signaled by AP. The number of STUs (or BTUs) which may be allocated to one STA depending on the size of the bandwidth disclosed in Table 1 is just an example.

When the bandwidth (e.g., 20 MHz bandwidth, 40 MHz bandwidth, 80 MHz bandwidth) in 20 MHz units is allocated to one STA, a numerology based on 242 tones may be used again. One STA may be allocated available tones corresponding to the multiple of 242 tones such as 242 tones (20 MHz bandwidth), 484 tones (40 MHz bandwidth), and 968 tones (80 MHz bandwidth).

Further, when the bandwidth of 20 MHz units is allocated to one STA, the total BTUs and total STUs which may be allocated based on the size of each bandwidth may be allocated to one STA. For example, 2 BTUs and 5 STUs may be allocated for 20 MHz bandwidth, and 4 BTUs and 10 STUs (or 3 BTUs and 6 STUs) may be allocated for 40 MHz bandwidth. If both BTU and STU are allocated to one user, the interleaving may be performed for each of the BTU and the STU (or a specific combination of BTU and STU), or another interleaver may be additional designed and used.

Further, according to an embodiment of the present invention, 56 tones corresponding to one BTU are divided into two 26 tone units and leave 4 leftover tones. Hence, the number of BTUs which may be allocated on the bandwidth may be reduced, and instead, the number of STUs which may be allocated on the bandwidth may be increased. When the number of BTUs which may be allocated on the bandwidth is reduced by 1 in Table 1, the number of STUs which may be allocated on the bandwidth may be increased by 2.

Further, when one BTU corresponds to 114 tones, the BTU of 114 tones is divided into 4 STUs, and 10 leftover tones may be leaved. Likewise, the BTU of 114 tones is reduced by 1, and the STU corresponding to 26 tones may be increased by 4 so as to change the number of BTUs and STUs which may be allocated on the bandwidth.

On the contrary, the number of STUs may be reduced, and the number of BTUs may be increased according to the STU. For example, the BTU of 56 tone unit may be generated by combining 2 STUs of 26 tones and 4 leftover tones. Further, a plurality of STUs may be combined and used as one resource unit. For example, by combining 2 STUs of 26 tones, STU of 52 tones may be defined and used.

Virtual allocation is not performed in the left side of FIG. 2, and the case that BTU and/or STU are allocated to STA1 and STA4 is disclosed.

Referring to the left side of FIG. 2, STA1 may be allocated one BTU adjacent to the guard tone, and STA2 may be allocated 2 BTUs. Further, STA3 may be allocated one BTU adjacent to the DC tone, and the STA4 may be allocated 4 distributed STUs.

The case that the virtual allocation resource unit, BTU and/or STU are allocated to STA1 to STA4 is disclosed by the performance of virtual allocation in the right side of FIG. 2.

Referring to the right side of FIG. 2, the virtual allocation resource unit corresponding to 242 tones adjacent to the guard tone, and the STA2 may be allocated one BTU. Further, STA3 may be allocated another virtual allocation resource unit adjacent to another guard tone, and STA4 may be allocated 4 distributed STUs.

Table 2 below shows another method of allocating BTU and STU on 20 MHz, 40 MHz, and 80 MHz bandwidths.

TABLE 2

|  | 20 MHz | 40 MHz | 80 MHz |
|---|---|---|---|
| Basic tone unit (BTU) | 56 tones | 56 tones | 56 tones |
| Small tone unit (STU) |  | 26 tones |  |
| Total # of BTUs | 2 | 4 | 8 |
| Total # of STUs | 5 | 10 | 21 |
| Total available tones except guard/DC tones | 242 tones | 484 tones | 994 tones |
| Possible # of BTUs allocated to a STA | 1, 2 | 1, 2 | 1, 2, 4 |
| Possible # of STUs allocated to a STA | 1, 2, 4, 5 | 1, 2, 4, 10 | 1, 2, 4, 21 |
| Maximum STA # of allocations | 7 | 14 | 29[4)] |

Referring to Table 2, when the total bandwidth is 20 MHz, BTU may be 56 tones and STU may be 26 tones. The number of available tones except the guard tone and the DC tone on 20 MHz bandwidth may be 242 tones, the total number of BTUs which may be allocated on 242 tones may be 2, and the total number of STUs which may be allocated may be 5. The sum of the total tones of 2 BTUs and 5 STUs is 242. 2 BTUs and 5 STUs may correspond to 242 tones which is the number of available tones on the 20 MHz bandwidth without a leftover tone.

One STA may be allocated 1 or 2 BTUs and/or 1, 2, 4 or 5 STUs on the 20 MHz bandwidth. Further, the resource allocation for the maximum 7 STAs (e.g., STA1: BTU1, STA1: BTU2, STA3: STU1, STA4: STU2, STA5: STA3, STA6: STU4, STA7: STU5) may be performed on the 20 MHz bandwidth based on the combination of BTUs and/or STUs.

When the total bandwidth is 40 MHz, the BTU may be 56 tones and the STU may be 26 tones.

The number of available tones except the guard tone and the DC tone on 40 MHz bandwidth may be 484 tones which is a multiple of 242 tones. The total number of BTUs which may be allocated on 484 tones may be 4, and the total number of BTUs which may be allocated may be 10. The sum of total tones of 4 BTUs and 10 STUs is 484. 4 BTUs and 10 STUs may correspond to 484 tones which is the number of tones available on the 40 MHz bandwidth without a leftover tone.

One STA may be allocated 1 or 2 BTUs and/or 1, 2, 4 or 10 STUs on 40 MHz bandwidth. Further, the resource allocation on the maximum 14 STAs may be performed on the 40 MHz bandwidth based on the combination of BTUs and/or STUs.

When the total bandwidth is 80 MHz, BTU may be 56 tones and STU may be 26 tones. The number of available tones except the guard tone and the DC tone on 80 MHz bandwidth may be 994 tones, and the total number of BTUs which may be allocated on 994 tones may be 8, and the total number of STUs which may be allocated may be 21. The sum of the total tones of 8 BTUs and 21 STUs is 994 tones. 8 BTUs and 21 STUs may correspond to 994 tones which is the number of available tones on 80 MHz bandwidth without a leftover tone.

One STA may be allocated 1, 2 or 4 BTUs and/or 1, 2, 4 or 21 STUs on 80 MHz bandwidth. Further, the resource allocation for the maximum 29 STAs may be performed on 80 MHz bandwidth based on the combination of BTUs and/or STUs.

242 tons corresponding to 2 BTUs and 5 STUs may be allocated to STA as the virtual allocation resource unit in Table 2. Further, 484 tones corresponding to 4 BTUs and 10 STUs may be allocated to STA as the virtual allocation resource unit.

As described above, when the virtual allocation resource unit is allocated to STA, the interleaving procedure based on the existing interleaver and the existing pilot insertion procedure may be performed.

Likewise, information on the number of STUs (or BTUs) which may be allocated to one STA) and/or the number of STUs (or BTUs) which are allocated to one STA may be signaled by AP. STUs (or BTUs) of a number smaller than the maximum number of STUs (or BTUs) which may be allocated by one STA may be allocated, and information (number and/or allocation location) on the STU or BTU) allocated to the STA may be signaled by AP. The number of STUs (or BTUs) which may be allocated to one STA depending on the size of the bandwidth disclosed in Table 2 is just an example.

Further, the maximum number of STAs which may be allocated on the bandwidth disclosed in Table 2 is also just an example. For example, only STAs of a number smaller than 20 may be supported on the bandwidth based on the limited resource combination.

Further, when the total bandwidth is allocated to one STA, the total BTUs and total STUs which may be allocated based on the size of each bandwidth may be allocated to one STA. For example, 2 BTUs and 5 STUs may be allocated for 20 MHz, 4 BTUs and 10 STUs (or 3 BTUs and 6 STUs) may be allocated for 40 MHz, and 8 BTUs and 21 STUs may be allocated for 80 MHz bandwidth.

Further, with respect to the resource allocation disclosed in Table 2, one BTU may be divided into a plurality of STUs or a plurality of STUs may be combined into one BTU (or combined STU) so that the number of BTUs and the number of STUs which may be allocated on the bandwidth may be changed.

Table 3 below shows a method of allocating BTUs and STUs on 20 MHz, 40 MHz, and 80 MHz bandwidths.

TABLE 3

|  | 20 MHz | 40 MHz | 80 MHz |
| --- | --- | --- | --- |
| Basic tone unit (BTU) | 56 tones | 56 tones | 56 tones |
| Small tone unit (STU) |  | 26 tones |  |
| Total # of BTUs | 2 | 6 | 10 |
| Total # of STUs | 5 | 6 | 17 |
| Total available tones (except guard/DC tones) | 242 tones | 492 tones | 1002 tones |
| Possible # of BTUs allocated to a STA | 1, 2 | 1, 2 | 1, 2, 4 |
| Possible # of STUs allocated to a STA | 1, 2, 4 | 1, 2, 4 | 1, 2, 4 |
| Maximum STA # of allocations | 7 | 12 | 27 |

Referring to Table 3, when the total bandwidth is 20 MHz, the BTU may be 56 tones and the STU may be 26 tones. The number of available tones except the guard tone and the DC tone on 20 MHz bandwidth may be 242 tones the total number of BTUs which may be allocated on 242 tones may be 2, and the total number of STUs which may be allocated may be 5. The total sum of tones of 2 BTUs and 5 STUs is 242 tones. 2 BTUs and 5 STUs may correspond to 242 tones which is the number of available tones on 20 MHz bandwidth without a leftover tone.

One STA may be allocated 1 or 2 BTUs and/or 1, 2 or 4 STUs on 20 MHz. Further, the resource allocation for the maximum 7 STAs (e.g., STA1: BTU1, STA1: BTU2, STA3: STU1, STA4: STU2, STA5: STA3, STA6: STU4, STA7: STU5) may be performed on the 20 MHz bandwidth based on the combination of BTUs and/or STUs.

When the total bandwidth is 40 MHz, the BTU may be 56 tones and the STU may be 26 tones.

The number of available tones except the guard tone and the DC tone on 40 MHz bandwidth may be 492 tones. The total number of BTUs which may be allocated on 492 tones may be 6, and the total number of STUs which may be allocated may be 6. The sum of total tones of 6 BTUs and 6 STUs is 492. 6 BTUs and 6 STUs may correspond to 492 tones which is the number of tones available on the 40 MHz bandwidth without a leftover tone.

One STA may be allocated 1 or 2 BTUs and/or 1, 2, 4 or 10 STUs on 40 MHz bandwidth. Further, the resource allocation on the maximum 12 STAs may be performed on the 40 MHz bandwidth based on the combination of BTUs and/or STUs.

When the total bandwidth is 80 MHz, BTU may be 56 tones and STU may be 26 tones. The number of available tones except the guard tone and the DC tone on 80 MHz bandwidth may be 1002 tones, and the total number of BTUs which may be allocated on 1002 tones may be 10, and the total number of STUs which may be allocated may be 17. The sum of the total tones of 10 BTUs and 17 STUs is 1002 tones. 10 BTUs and 17 STUs may correspond to 1002 tones which is the number of available tones on 80 MHz bandwidth without a leftover tone.

One STA may be allocated 1, 2 or 4 BTUs and/or 1, 2, 4 or 21 STUs on 80 MHz bandwidth. Further, the resource allocation for the maximum 27 STAs may be performed on 80 MHz bandwidth based on the combination of BTUs and/or STUs.

Hereinafter, a signaling method for a virtual allocation resource unit according to an embodiment of the present invention is disclosed. A signaling method for a virtual allocation resource unit of a size of 242 tones is disclosed for the convenience of description, but a signaling for the virtual allocation resource unit of another size may be performed in the same manner.

Allocation information for BTUs and STUs which are individual resource units which form the virtual allocation resource unit may be transmitted to STA for allocation of the virtual allocation resource unit. For example, when 2 BTUs and 5 STUs are allocated to the STA and when 242 virtual allocation resource unit are allocated to STA, the existing OFDM numerology (existing pilot allocation and existing interleaver size) based on the existing 242 tones may be utilized.

Further, when the number of BTUs which cannot be allocated to one user is allocated to reduce a signaling overhead, the allocation of the virtual allocation resource unit corresponding to 242 tones or a multiple of 242 tones may be indicated. For example, allocation of 3 BTUs to STA in the 20 MHz bandwidth may indicate allocation of the virtual allocation resource unit to STA.

For example, the case that the maximum 3 BTUs may be allocated to one STA, the case that the number of signaled BTUs indicates 3 or greater specific value, or an expressible largest value or 0, or the case that 2 BTUs and 5 STUs are combined and allocated to one STA as one virtual allocation resource may be indicated.

Further, when the number of specific BTUs which cannot be allocated is a first value (e.g., 3), the first virtual allocation resource unit is indicated, and when the number of specific BTUs which cannot be allocated is a second value (e.g., 4), the second virtual allocation resource unit (e.g., 484 tones) may be indicated.

Further, an indicator (e.g., a virtual allocation indicator) for allocation of a separate virtual allocation resource unit is defined, and a virtual allocation indicator may be used for allocation of a virtual allocation resource unit.

As described above, one BTU may be divided into a plurality of STUs and a leftover tone may be left according to the division into a plurality of STUs. For example, the BTU of 56 tones may be divided into 2 STUs and leave 4 leftover tones. The 4 leftover tones may be located between 2 divided STUs of 26 tones or may be used as 2 upper guard tones and lower guard tones of 26 tones after being divided in 2 leftover units. Information on the division of such a BTU to the STU may be also be signaled. The resource unit division information may be transmitted through a signaling for information on the division of BTU into STUs.

The resource unit division information may include information on the BTU which has been divided into STUs, the number of BTUs which have been changed and allocated on the total bandwidth and the number of STUs which have been changed and may be allocated.

On the contrary, a plurality of STUs may be combined to form a combined STU, or one STU may be divided to form divided STUs. Further, a plurality of BTUs may be combined to form a combined BTU, or one BTU may be divided to form divided BTUs. For example, when two STUs are combined, a combined STU of a 52 tone size may be generated, and when one STU is divided, 2 divided STUs of 13 tone size may be generated. The resource unit division information may include information related to combined STU, combined BTU, divided STU, and divided BTU.

Figure 3:
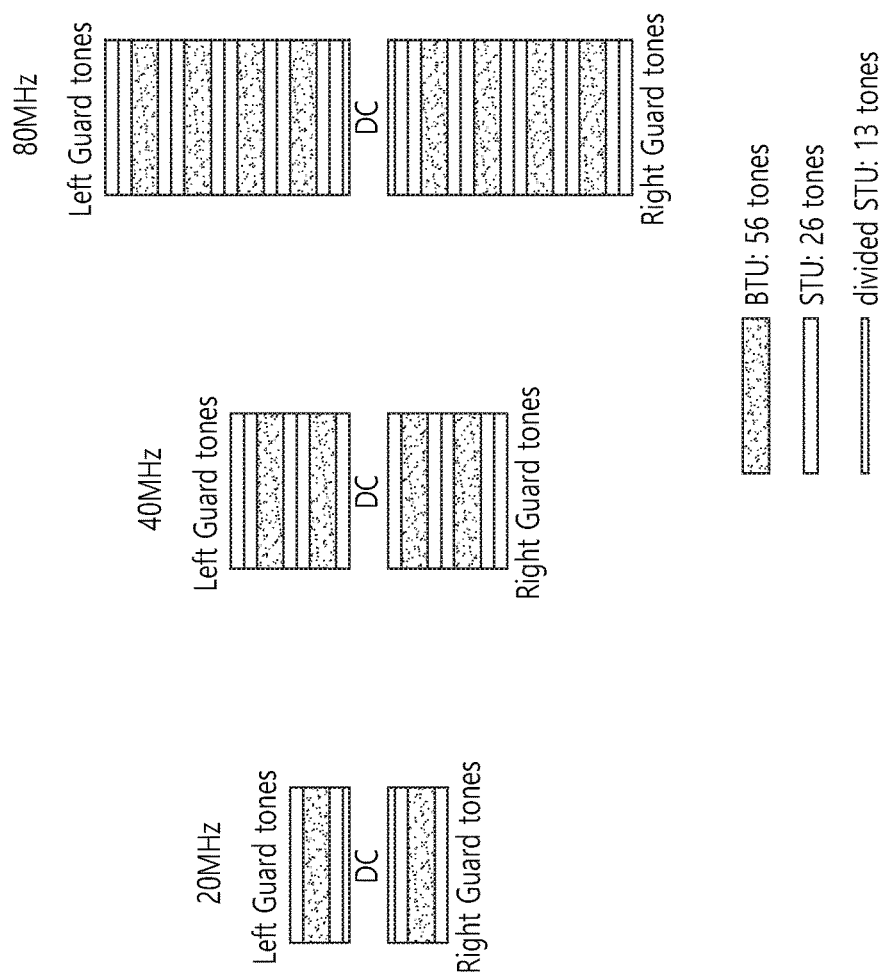
FIG. 3 is a conceptual diagram illustrating a method of allocating a resource on a bandwidth according to an embodiment of the present invention.

FIG. 3 is a conceptual diagram illustrating a method of allocating a resource on a bandwidth according to an embodiment of the present invention.

FIG. 3 discloses a method of allocating BTUs and STUs on 20 MHz, 40 MHz, and 80 MHz bandwidths.

Referring to the left side of FIG. 3, the case that 2 BTUs and 5 STUs are allocated on 20 MHz bandwidth is disclosed.

From the low frequency band to the high frequency band, the left guard tone, STU (26 tones), BTU (56 tones), STU (26 tones), divided STU (13 tones), DC, divided STU (13 tones), STU (26 tones), BTU (56 tones), STU (26 tones), and right guard tone may be allocated.

Referring to the middle part of FIG. 3, 4 BTUs and 10 STUs are allocated on 40 MHz bandwidth.

From the lower frequency band to the high frequency band, left guard tone, STU (26 tones), STU (26 tones), BTU (56 tones), STU (26 tones), STU (26 tones), BTU (56 tones), STU (26 tones), DC, STU (26 tones), BTU (56 tones), STU (26 tones), STU (26 tones), BTU (56 tones), STU (26 tones), STU (26 tones), and right guard tone may be allocated.

Referring to the right side of FIG. 3, 8 BTUs and 21 STUs are allocated on 80 MHz bandwidth.

From the low frequency band to the high frequency band, left guard tone, STU (26 tones), STU (26 tones), BTU (56 tones), STU (26 tones), STU (26 tones), BTU (56 tones), STU (26 tones), STU (26 tones), BTU (56 tones), STU (26 tones), STU (26 tones), BTU (56 tones), STU (26 tones), STU (26 tones), divided STU (13 tones), DC, divided STU (13 tones), STU (26 tones), STU (26 tones), BTU (56 tones), STU (26 tones), STU (26 tones), BTU (56 tones), STU (26 tones), STU (26 tones), BTU (56 tones), STU (26 tones), STU (26 tones), BTU (56 tones), STU (26 tones), STU (26 tones), and right guard tone may be allocated.

As described above, STUs of 26 tones may be combined to form a combined STU of 52 tones or may be divided into 13 tones to form a divided STU. BTU of 56 tones may be divided into 2 divided BTUs of 28 tones (or divided into 2 STUs of 26 tones and 4 leftover tones) or divided into 4 divided BTUs of 14 tones.

According to another embodiment of the present invention, 6 BTUs of 114 tones and 12 STUs of 26 tones may be allocated on 80 MHz bandwidth.

From the low frequency band to the high frequency band, left guard tone, STU (26 tones), BTU (114 tones), STU (26 tones), STU (26 tones), BTU (114 tones), STU (26 tones), STU (26 tones), BTU (114 tones), STU (26 tones), DC, STU (26 tones), BTU (114 tones), STU (26 tones), STU (26 tones), BTU (114 tones), STU (26 tones), STU (26 tones), BTU (114 tones), STU (26 tones), and right guard tone may be allocated.

As described above, STUs of 26 tones may be combined to form a combined STU of 52 tones or may be divided into divided STUs of 13 tones. BTU of 114 tones may be divided into 2 divided BTUs of 57 tones or divided into 3 divided BTUs of 38 tones.

Figure 4:
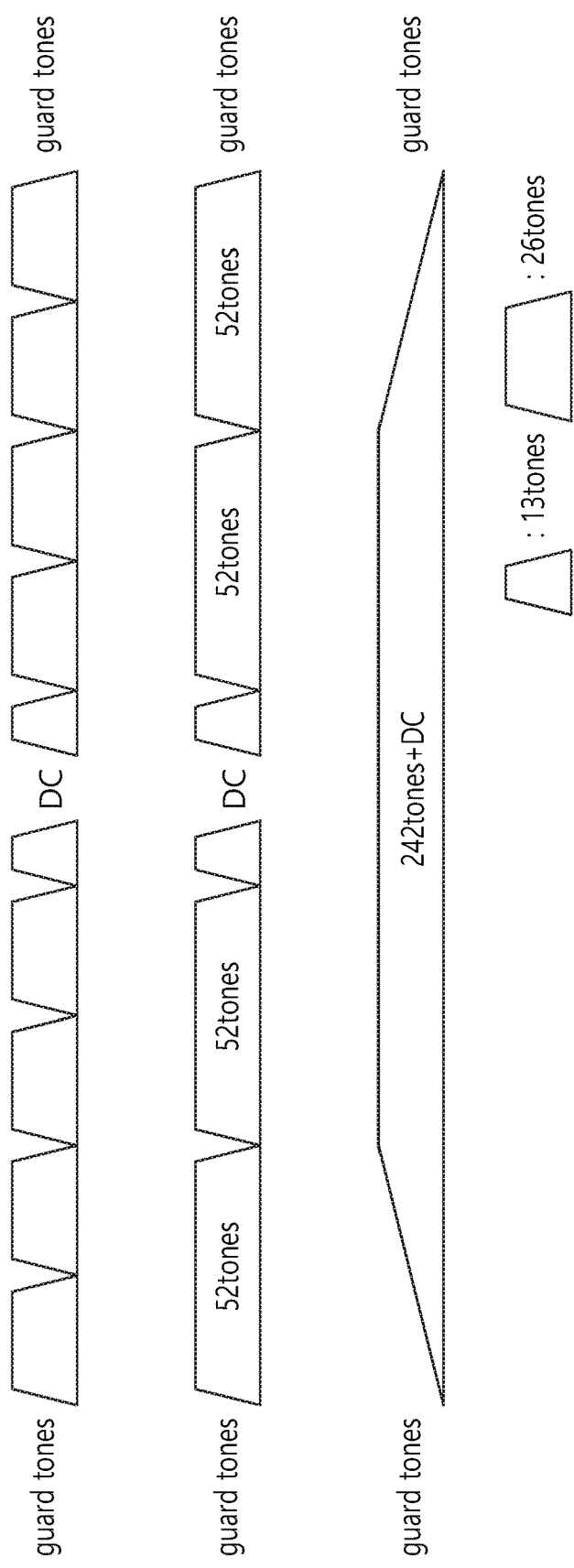
FIG. 4 illustrates a method of allocating a virtual allocation resource unit according to an embodiment of the present invention.

FIG. 4 illustrates a method of allocating a virtual allocation resource unit according to an embodiment of the present invention.

FIG. 4 discloses resource allocation on 20 MHz bandwidth. A leftover tone is not displayed on the entire bandwidth for the convenience of description.

Referring to the bottom of FIG. 4, 242 tones except DC tone and guard tone may be allocated on 20 MHz bandwidth. At this time, 6 tones may be used as the guard tone at one side and 5 tones may be used as the guard tone at another side. Further, 3 tones may be used as the DC tone. 242 tones may be allocated as the wireless resource of one STA.

Referring to the middle part of FIG. 4, the total of 242 tones may be divided so that 4 combined STU units and 1 STU may be allocated. As described above, a plurality of STUs may be combined to form one combined STU unit.

When 2 BTUs and 5 STUs are possible on 20 MHz bandwidth, 2 BTUs may be divided into 4 STUs. Hence, 9 STUs may be allocated on 20 MHz bandwidth, and among 9 STUs, 8 STUs may be combined in 2 STU units to form 4 combined STUs (combined STU1, combined STU2, combined STU3, and combined STU4). Further, one STU may be divided on the basis of the DC tone so form 2 divided STUs (divided STU1 and divided STU2).

From the low frequency band to the high frequency band, first guard tone (or left guard tone), combined STU1 (52 tones), combines STU2 (52 tones), divides STU1 (13 tones), DC tone, divided STU2 (13 tones), combined STU3 (52 tones), combined STU4 (52 tones), and second guard tone (or right side guard tone) may be allocated.

Referring to the upper part of FIG. 4, when 2 BTUs and 5 STUs are possible on 20 MHz bandwidth, 2 BTUs may be divided to form 4 STUs. Hence, 9 STUs may be allocated on 20 MHz bandwidth, and among 9 STUs, 8 STUs (STU1 to STU8) are used as themselves, and the remaining one STU may be adjacent to the DC tone to be divided into 2 divided STUs (divided STU1 and divided STU2).

From the low frequency band to the high frequency band, first guard tone (or left guard tone), STU1 (26 tones), STU2 (26 tones), STU3 (26 tones), STU4 (26 tones), divided STU1 (13 tones), DC, divides STU2 (13 tones), STU5 (26 tones), STU6 (26 tones), STU7 (26 tones), STU8 (26 tones), and second guard tone (or right guard tone) may be allocated.

Figure 5:
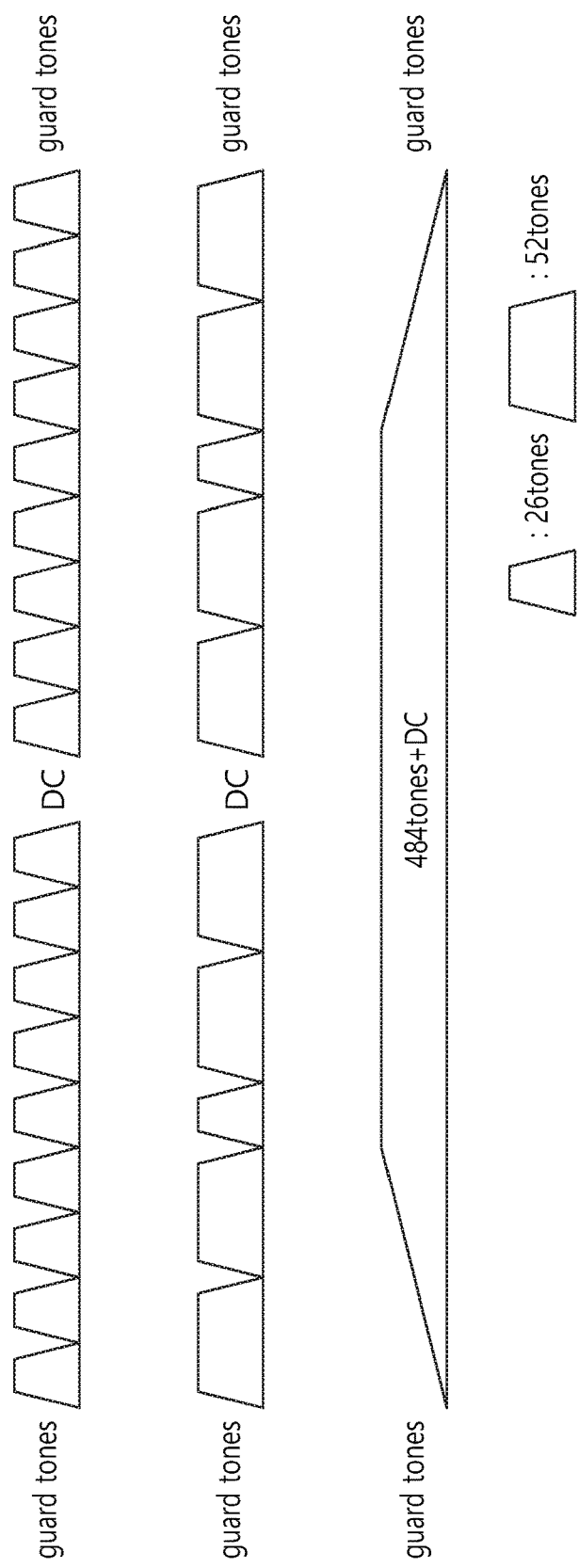
FIG. 5 illustrates a method of allocating a virtual allocation resource unit according to an embodiment of the present invention.

FIG. 5 illustrates a method of allocating a virtual allocation resource unit according to an embodiment of the present invention.

FIG. 5 discloses resource allocation on 40 MHz bandwidth. A leftover tone is not displayed on the entire bandwidth for the convenience of description.

Referring to the bottom of FIG. 5, 484 tones except DC tone and guard tone may be allocated on 40 MHz bandwidth. For example, 12 tones are used as the left guard tone (or right guard tone), and 11 tones may be used as the right guard tone (or left guard tone). Further, 5 tones may be used as the DC tone. 484 tones may be allocated as the wireless resource of one STA, or each of two 242 tones forming 484 tones may be allocated the wireless resources of two respective STAs.

Referring to the middle part of FIG. 5, the total of 484 tones may be divided so that 8 combined STUs of 52 tones and 2 STUs of 26 tones may be allocated on 484 tones.

When 4 BTUs and 10 STUs are possible on 40 MHz bandwidth, 4 BTUs may be divided into 8 STUs. In such a case, 18 STUs may be allocated on 40 MHz bandwidth. Among 18 STUs, 16 STUs may be combined to form 8 combined STUs of 52 tones (combined STU1 to combined STU8) so as to be allocated on the bandwidth, and the remaining 2 STUs (STU1 and STU2) may be allocated on the bandwidth as itself.

For example, from the low frequency band to the high frequency band, first guard tone (or left guard tone), combined STU1, combined STU2, STU1, combined STU3, combined STU4, DC, combined STU5, combined STU6, STU2, combined STU7, combined STU8, and second guard tone (or right guard tone) may be allocated.

Referring to the upper part of FIG. 5, a total of 484 tones may be divided so that 18 STUs of 26 tones may be allocated on 484 tones.

When 4 BTUs and 10 STUs are possible on 40 MHz bandwidth, 4 BTUs may be divided into 8 STUs. In such case, a total of 18 STUs (STU1 to STU18) may be allocated on 40 MH bandwidth.

For example, from the lower frequency band to the high frequency band, first guard tone, STU1, STU2, STU3, STU4, STU5, STU6, STU7, STU8, STU9, DC, STU10, STU11, STU12, STU13, STU14, STU15, STU16, STU17, STU18 and second guard tone may be allocated.

Hereinafter, in an embodiment of the present invention, a semi-static or scalable OFDMA allocation method based on the existing granularity is disclosed.

The granularities of the wireless resource existing in the existing wireless LAN may include 26 tones, 56 tones, 114 tones, and 242 tones. A resource allocation unit greater than 242 tones may be allocated based on the resource allocation unit of a plurality of 242 tones. The resource allocation unit of the same size as 2 times of 242 tones (484 tones) and 4 times of 242 tones (968 tones) may be used.

The resource allocation may be performed on the assumption that the resource allocation unit of 242 tones is the largest resource unit among the resource allocation units.

The following resource allocation may be performed according to the size of the bandwidth based on the resource allocation unit of 242 tones which is the largest resource allocation unit. Hereinafter, the resource allocation unit of 242 tones is called "basic resource allocation unit". The basic resource allocation unit may be a resource allocation unit to which tones of a number other than 242 are allocated, and such embodiment are also included in the scope of rights of the present invention. For example, the size of the basic resource allocation unit may be determined based on different interleaver sizes (108, 52, 24, etc.) which have been used in the existing wireless LAN system.

Figure 6:
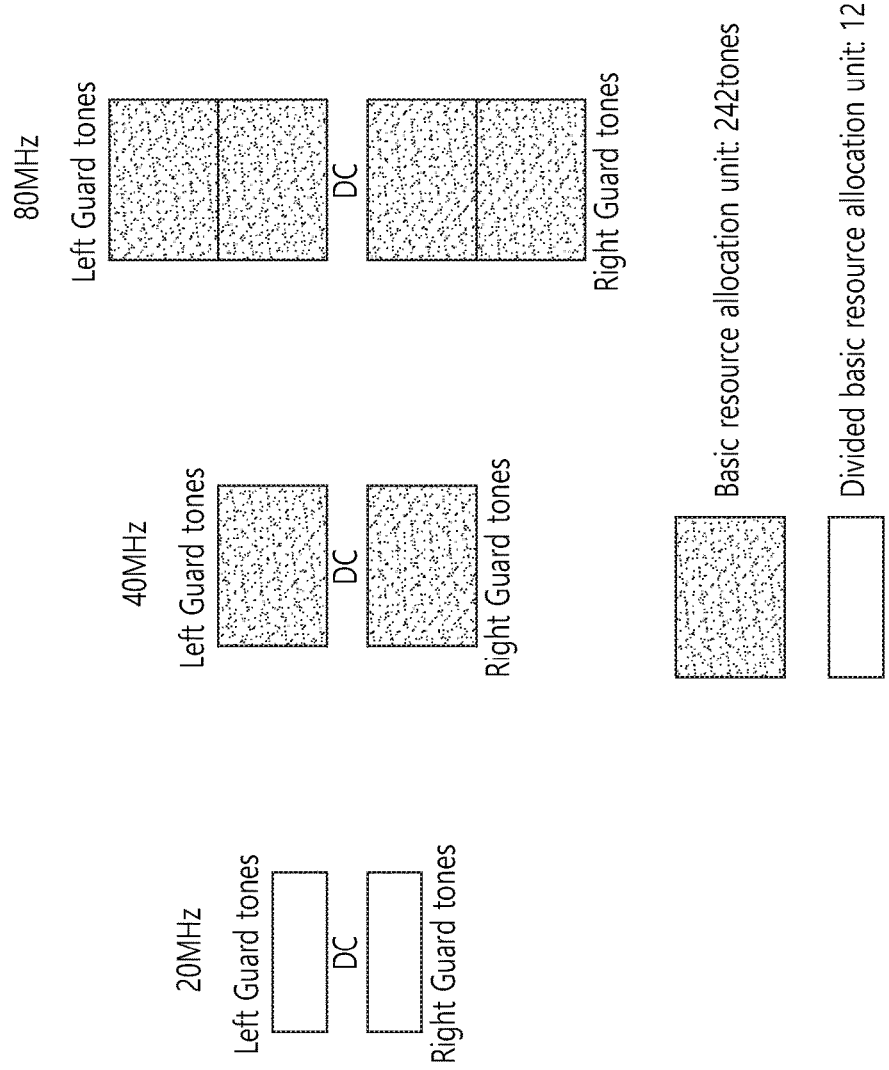
FIG. 6 is a conceptual diagram illustrating a method of allocating a resource according to an embodiment of the present invention.

FIG. 6 is a conceptual diagram illustrating a method of allocating a resource according to an embodiment of the present invention.

FIG. 6 discloses a resource allocation based on the basic resource allocation unit. The basic resource allocation unit of 242 tones may be divided into 2 divided basic resource allocation units of 121 tones so as to be located in the resource area adjacent to the DC tone.

In the left side of FIG. 6, the resource allocation based on the resource allocation unit of 242 tones on 20 MHz bandwidth is disclosed.

Referring to the left side of FIG. 6, the left guard tone, the divided basic resource allocation unit 1 (121), DC, divided basic resource allocation unit 2 (121), and right guard tone may be allocated.

In the middle of FIG. 6, the resource allocation based on the resource allocation unit of 484 tones on 40 MHz bandwidth is disclosed.

Referring to the middle part of FIG. 6, the left guard tone, basic resource allocation unit 1 (242), DC, basic resource allocation unit 2 (242), and right guard tone may be allocated on 40 MHz bandwidth. Further, the left guard tone, basic resource allocation unit 1 (242), STU 7, DC, STU 7, basic resource allocation unit 2 (242), and right guard tone may be allocated on 40 MHz bandwidth. The STU may be a resource unit corresponding to a tone of a number other than 7.

In the right side of FIG. 6, resource allocation based on the resource allocation unit of 968 tones on 80 MHz bandwidth is disclosed.

Referring to the right side of FIG. 6, the left guard tone, basic resource allocation unit 1 (242), basic resource allocation unit 2 (242), DC, divided basic resource allocation unit 3 (242), divided basic resource allocation unit 4 (242), and right guard tone may be allocated on 80 MHz bandwidth. Alternatively, the left guard tone, basic resource allocation unit 1 (242), STU 13, basic resource allocation unit 2 (242), DC, divided basic resource allocation unit 3 (242), STU 13, divided basic resource allocation unit 4 (242), and right guard tone may be allocated on 80 MHz bandwidth. The STU may be a resource unit corresponding to a ton of a number other than 13.

Some tones allocated to the left guard tone, right guard tone, and DC tone may be allocated between resource units so as to be used for user allocation separation (or resource allocation for each STA), common pilot, automatic gain control (AGC), phase tracking, etc.

Further, in order to support a user equipment (UE) supporting a bandwidth smaller than 40 MHz and 80 MHz (e.g., a UE supporting 20 MHz bandwidth), some basic resource allocation units allocated to each of 40 MHz and 80 MHz bandwidths may include a null tone for DC tone or guard tone.

For example, the UE supporting 20 MHz bandwidth may be allocated one basic resource allocation unit of 242 tones on 40 MHz bandwidth. However, DC tone and guard tone are not included in the basic resource allocation unit. Hence, among 242 tones included in the basic resource allocation unit, a null tone may be inserted for some tones in order to be utilized as a DC tone and/or guard tone for the UE supporting 20 MHz bandwidth.

The basic resource allocation unit, divided basic resource allocation unit, and STU location disclosed in FIG. 6 may be differently allocated on the entire bandwidth.

The basic resource allocation unit may be divided into a plurality of divided basic resource allocation units which are relatively small.

Figure 7:
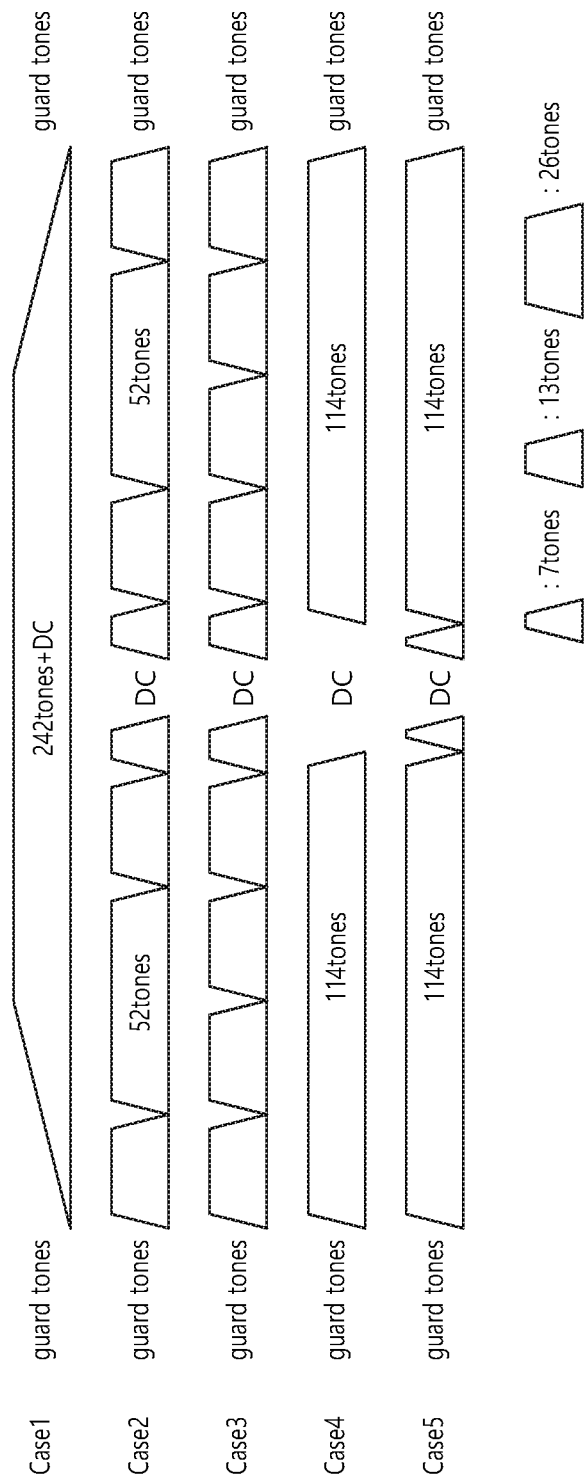
FIG. 7 is a conceptual diagram illustrating a method of allocating a resource according to an embodiment of the present invention.

FIG. 7 is a conceptual diagram illustrating a method of allocating a resource according to an embodiment of the present invention.

FIG. 7 discloses a method of dividing the basic resource allocation unit into a plurality of relatively small divided basic resource allocation units. It is assumed that the divided basic resource allocation unit is BTU of 56 tones or 114 tones or STU of 26 tones.

Referring to FIG. 7, the basic resource allocation unit may be divided into a plurality of divided basic resource allocation units of various sizes.

In case 1, the case that basic resource allocation units of 242 tones are used without being divided is disclosed. The basic resource allocation unit of 242 tones may be used as one unit and allocated as the wireless resource of one STA. When the basic resource allocation unit is used, the interleaving may be performed based on the basic interleaver size (234 size), and 8 pilot tones may be inserted into the same location as before.

In case 2, the case that the basic resource allocation unit of 242 tones is divided into 2 BTUs and 5 STUs is disclosed. Namely, the basic resource allocation unit of 242 tones may be divided into 2 BTUs of 56 tones and 5 STUs of 26 tones. Each of 2 BTUs and 5 STUs may be allocated at a predetermined location or may be flexibly located on 242 tones.

In case 3, the case that the basic resource allocation unit of 242 tones is divided into 9 STUs is disclosed. Namely, the basic resource allocation unit of 242 tones may be divided into 9 STUs of 26 tones. In such a case, 8 leftover tones are left. 8 leftover tones may be utilized as pilot tone, user allocation separation, guard tone, a tone for AGC or phase tracking, etc. In case 3, specifically, left guard tone 6, leftover tone 1, STU1 (26), STU2 (26), leftover ton 1, STU3 (26), STU5 (26), divided STU1 (13), DC 7, divided STU2 (13), STU5 (26), STU6 (26), leftover tone 1, STU7 (26), STU8 (26), leftover tone 1, and right guard tone 5 may be allocated on the entire bandwidth. The leftover tone may be a tone without energy.

In case 4, the case that the basic resource allocation unit of 242 tones is divided into 2 BTUs of 114 tones is disclosed. When the basic resource allocation unit of 242 tones is divided into 2 BTUs of 114 tones, 14 leftover tones are left. The 14 leftover tones may be utilized pilot tone, user allocation separation, a tone for guard tone, AGC or phase tracking, etc.

In case 5, in case 5, the case that the basic resource allocation unit of 242 tones is divided into 2 BTUs of 114 tones and a new resource allocation unit of 14 units is disclosed. The basic resource allocation unit of 242 tones may be divided into 2 BTUs of 114 tones, and the remaining 14 tones may be used as one resource allocation unit.

According to an embodiment of the present invention, information on the resource allocation may be transmitted in respective OFDM symbol units or frame units. For example, AP may transmit information on the division of the basic resource allocation unit (or configuration of the basic resource allocation unit) for frame transmission to STA. Further, as another example, AP may transmit information on the division of the basic resource allocation unit (or configuration of the basic resource allocation unit) on OFDM symbol to STA.

The information on the configuration of the basic resource allocation unit may be transmitted through SIG (signal) field of the MAC (medium access control) header of the frame or transmitted through a separate frame such as a trigger frame.

Each of the plurality of basic resource allocation units on the entire bandwidth may be configured (or divided) in the same manner. In such a case, information on the configuration of one basic resource allocation unit may be related with the configuration of the plurality of basic resource allocation units on the entire bandwidth.

Further, each of the plurality of basic resource allocation units on the entire bandwidth may be configured (or divided) in different manners. In such a case, information on the configuration of the basic resource allocation unit related with the configuration of each of a plurality of basic resource allocation units located on the entire bandwidth may be signaled.

The signaling bit, which transmits information on the configuration of the basic resource allocation unit, may be composed of 1 to 3 bits. For example, the signaling bit, which transmits information on the configuration of the basic resource allocation unit, may indicate one of cases 1 to 5 as described above.

Likewise, if the resource allocation is performed in the basic resource allocation unit of 242 tones, the resource for MU-MIMO may also be allocated in the basic resource allocation unit of 242 tones. Additionally, information on the configuration of the basic resource allocation unit for MU-MIMO may be transmitted based on the indicator indicating the configuration of the basic resource allocation unit for MU-MIMO.

Further, the basic resource allocation unit of 242 tones may be applied to the SU (single user) transmission and allocated to user. Namely, the basic resource allocation unit may be applied in a unified structure for SU/MU OFDMA transmission and MU-MIMO transmission.

Further, different values may be signaled as information for the basic resource allocation unit by dividing resource allocation for DL transmission and resource allocation for UL transmission.

Information (individual STA allocation information) on allocation each of the plurality of divided basic resource allocation units included in the configuration of the basic resource allocation unit to a plurality of STAs as well as information on the configuration of the basic resource allocation unit may be transmitted. The size of the signaling bit for individual STA allocation information may be changed. For example, when one basic resource allocation unit includes a relatively large number of divided basic resource allocation units, the signaling bit size for the individual STA allocation information may be relatively large. On the contrary, when one basic resource allocation unit includes a relatively small divided basic resource allocation unit, the signaling bit size for the individual STA allocation information may be relatively small.

For example, when the basic resource allocation unit includes a relatively large number of divided basic resource allocation units as in case 2 rather than when the basic resource allocation unit is not divided as in case 1, the signaling bit size for individual STA allocation information may become relatively small.

The resource allocation to STA on the entire bandwidth may be on the basis of the basic resource allocation unit or on the basis of the entire bandwidth. For example, the wireless allocation for x persons may be allocate din the basic resource allocation unit (e.g., 242 tones), and the basic resource allocation unit may be scalably extended to the entire bandwidth.

One STA may allocate the resource from each of a plurality of basic resource allocation units for the reasons such as a band selection gain and a diversity gain. Hence, the wireless resource may be allocated on the basis of the entire bandwidth including a plurality of basic resource allocation units.

When the information on the resource allocation is signaled on the basis of the entire bandwidth, the resource units may be arranged in order from the largest resource unit (or the smallest or a predetermined type) and grouped logically (or virtually), then the signaling overhead may be reduced through the signaling for the individual group. For example, a plurality of BTUs may be virtually grouped so as to generate one BTU group, and a plurality of STUs may be virtually grouped so as to generate one STU group. The BTU, which has been allocated to the STA, is indicated based on the BTU group, and the STU allocated to the STA may be indicated based on the STU group.

According to an embodiment of the present invention, when the MU transmission such as OFDMA and MU-MIMO is supported, the maximum number of allocations (or maximum STA number) which may be simultaneously supported in one symbol or one frame may be restricted in consideration of the overhead of the system, etc.

The case that MU-OFDMA transmission and MU-MIMO transmission are performed based on the basic resource allocation unit of 242 tones may be assumed. The maximum number of STAs which may be allocated to the basic resource allocation unit at the time of transmitting MU-OFDMA may be defined as X_OFDMA, and the maximum number of STAs which may be allocated to the basic resource allocation unit at the time of transmitting MU-MIMO may be defined as X_MIMO.

The maximum number of STAs which may be allocated for each size of the bandwidth may be as follows.

In regards to 20 MHz bandwidth, max (X_OFDMA, X_MU-MIMO) may be the maximum number of STAs which may be allocated on the bandwidth.

In regards to 40 MHz bandwidth, max (X_OFDMA, X_MU-MIMO)*2 or max (X_OFDMA, X_MU-MIMO)*2+1 (if there is an additional resource allocation unit) may be the maximum number of STAs which may be allocated on the bandwidth.

In regards to 80 MHz bandwidth, max (X_OFDMA, X_MU-MIMO)*4 or max (X_OFDMA, X_MU-MIMO)*4+1 (if there is an additional resource allocation unit) may be the maximum number of STAs which may be allocated on the bandwidth.

Namely, the maximum number among the maximum number of STAs which may be allocated in the basic resource allocation unit at the time of transmitting MU-OFDMA and the maximum number of STAs which may be allocated in the basic resource allocation unit at the time of transmitting MU-MIMO may be the maximum number of STAs which may be allocated in the basic resource allocation unit.

If X_OFDMA=9 (e.g., 9 STUs 26 allocated to the basic resource allocation unit) and X_MU-MIMO=4 (the additional allocation resource unit other than 242 is not called MU-MIMO), the maximum number of STAs which may be allocated for each size of the bandwidth may be max (9, 4)=9 for 20 MHz bandwidth, 18 or 19 for 40 MHz bandwidth, and 36 or 37 for 80 MHz bandwidth.

In order to reduce the signaling overhead due to the increase of the number of users, the maximum number of STAs which may be allocated according to the size of the bandwidth may be restricted.

MAX_alloc below may be the maximum number of STAs which may be allocated on the entire bandwidth based on MU-OFDMA transmission and/or MU-MIMO transmission.

In regards to 20 MHz bandwidth, min (MAX_alloc, max (X_OFDMA, X_MU-MIMO)) may be the maximum number of STAs which may be allocated.

In regards to 40 MHz bandwidth, min (MAX_alloc, max (X_OFDMA, X_MU-MIMO)*2) may be the maximum number of STAs which may be allocated.

In regards to 80 MHz bandwidth, min (MAX_alloc, max (X_OFDMA, X_MU-MIMO)*4) may be the maximum number of STAs which may be allocated.

In order to reduce the signaling overhead due to the increase in the number of users, the maximum number of STAs which may be allocated according to the size of the bandwidth may be restricted as follows.

In regards to 20 MHz bandwidth, max (X_OFDMA, X_MU-MIMO) may be the maximum number of STAs which may be allocated.

In regards to 40 MHz bandwidth, max (X_OFDMA, X_MU-MIMO)*2 or (X_OFDMA, X_MU-MIMO)*2+1 may be the maximum number of STAs which may be allocated.

In regards to 80 MHz bandwidth, max (X_OFDMA, X_MU-MIMO)*2 or (X_OFDMA, X_MU-MIMO)*2+1 may be the maximum number of STAs which may be allocated.

Namely, in regards to 40 MHz and 80 MHz, max (X_OFDMA, X_MU-MIMO)*2 or (X_OFDMA, X_MU-MIMO)*2+1 may be used for restriction.

As another method, X_OFDMA, X_MU-MIMO may be differently set for each bandwidth size.

The maximum number of STAs which may be allocated in the basic resource allocation unit at the time of transmitting MU-OFDMA on 20 MHz bandwidth may be defined as X_OFDMA_20, and the maximum number of STAs which may be allocated to the basic resource allocation unit may at the time of transmitting MU-MIMO be defined as X_MU-MIMO_20 on 20 MHz bandwidth.

The maximum number of STAs which may be allocated in the basic resource allocation unit at the time of transmitting MU-OFDMA on 40 MHz bandwidth may be defined as X_OFDMA_40, and the maximum number of STAs which may be allocated to the basic resource allocation unit may at the time of transmitting MU-MIMO be defined as X_MU-MIMO_40 on 40 MHz bandwidth.

The maximum number of STAs which may be allocated in the basic resource allocation unit at the time of transmitting MU-OFDMA on 80 MHz bandwidth may be defined as X_OFDMA_80, and the maximum number of STAs which may be allocated to the basic resource allocation unit may at the time of transmitting MU-MIMO be defined as X_MU-MIMO_80 on 80 MHz bandwidth.

In regards to 20 MHz bandwidth, max (X_OFDMA_20, X_MU-MIMO_20) may be the maximum number of STAs which may be allocated.

In regards to 40 MHz bandwidth, max (X_OFDMA_20, X_MU-MIMO_20)*2 may be the maximum number of STAs which may be allocated.

In regards to 80 MHz bandwidth, max (X_OFDMA_20, X_MU-MIMO_20)*4 may be the maximum number of STAs which may be allocated.

For example, it may be that X_OFDMA_20=9, X_OFDMA_40=9, X_OFDMA_80=5, X_MU-MIMO_20=8, X_MU_MIMO_40=8 (or 4), and X_MU_MIMO_80=4.

In regards to 20 MHz bandwidth, max (9, 8)=9 may be the maximum number of STAs which may be allocated.

In regards to 40 MHz bandwidth, max (9, 8)*2=18 may be the maximum number of STAs which may be allocated.

In regards to 80 MHz bandwidth, max (5, 4)*4=20 may be the maximum number of STAs which may be allocated.

Hereinafter, in an embodiment of the present invention, a method of allocating another resource based on BTU and STU is disclosed.

BTU and STU may be defined as Table 4 below.

TABLE 4

| BW | BTU | STU | Leftover tones (assuming 11 guard + 3 DC) |
|---|---|---|---|
| 20 MHz | 56 tones | 7 tones for entire bandwidth | 4 |
| 40 MHz | 56 tones (option 1) or 114 tones (option 2) | | 0 (option 2) |
| 80 MHz | 114 tones | | 0 |

Referring to Table 4, in regards to 20 MHz bandwidth, BTU of 56 tones (52 data tones and 4 pilot tones) may be allocated. In regards to 40 MHz bandwidth, BTU of 56 tones (data tone 52, pilot tone 4) (when a lot of resource allocations are necessary) or 114 tones (data tone 108, pilot tone 6) (leaving relative small leftover tones) may be allocated. In regards to 80 MHz bandwidth, BTU of 114 tones (108 data tones and 6 pilot tones) may be allocated.

In the case of STU, 7 tones may be allocated irrespective of the size of the entire bandwidth. 14 tones (12 data tones and 2 pilot tones) generated by the combination of two STUs may be used as the minimum resource allocation unit (or minimum granularity).

Referring to Table 4, when 114 tones are used, the resource allocation may be performed without a leftover tone.

Figure 8:
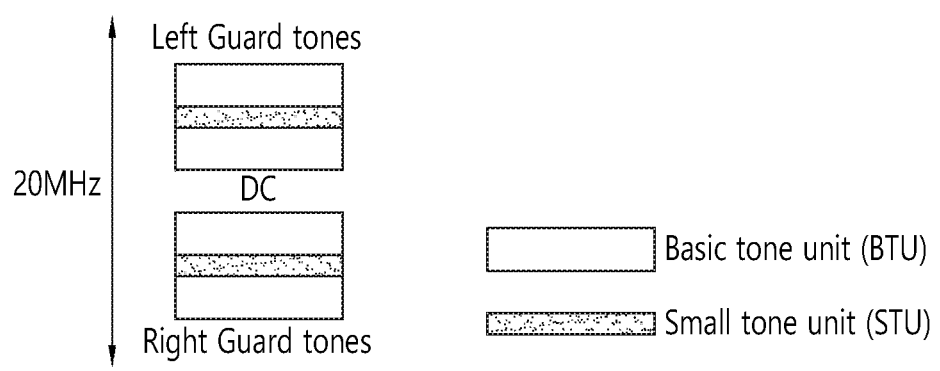
FIG. 8 is a conceptual diagram illustrating a method of allocating a resource according to an embodiment of the present invention.

FIG. 8 is a conceptual diagram illustrating a method of allocating a resource according to an embodiment of the present invention.

FIG. 8 discloses a resource allocation for 256 tones of 20 MHz bandwidth.

Referring to FIG. 8, BTU is a resource unit corresponding to 56 tones and STU may be a resource unit corresponding to 7 tones.

In 256 tones, if 11 tones for the left guard tone and the right guard tone and 7 tones for DC tones are excepted, 238 tones are left. 238 tones may be allocated to 4 BTUs and 2 STUs.

For example, the left guard tone, BTU1, STU1, BTU2, DC, BTU3, STU2, BTU4 and the right guard tone may be located on 20 MHz bandwidth.

When the resource allocation to one STA on 20 MHz bandwidth is performed, STA may operate on the basis of the existing 242 tone numerology. Namely, STA may operate based on the virtual allocation resource unit without considering resource division such as BTU and STU.

When the resource allocation into 2 STAs is performed on 20 MHz bandwidth, 4 BTUs may be allocated to one STA and 2 STUs may be allocated to the other STA.

When resource allocation into 3 STAs is performed on 20 MHz bandwidth, 2 BTUs may be allocated to one STA, 2 BTUs may be allocated to another STA, and 2 STUs may be allocated to the remaining one STA.

The resource allocation to the maximum 5 STAs may be performed on 20 MHz bandwidth.

One BTU may be divided into 8 STUs, and 2 BTUs may be divided into 16 STUs. In such a case, 2 BTUs and 18 STUs may be located on 20 MHz bandwidth. If resource allocation into more STAs is necessary on 20 MHz bandwidth, resource allocation may be performed on the basis of STUs generated by dividing BTU.

In regards to BTU, the interleaving which uses the existing interleaver of 52 size may be performed, and in regards to STU, the interleaving which uses the interleaver of 12 size may be performed for 14 tons (12 data tones and 2 pilot tones) which have been generated in combination of two STUs.

Figure 9:
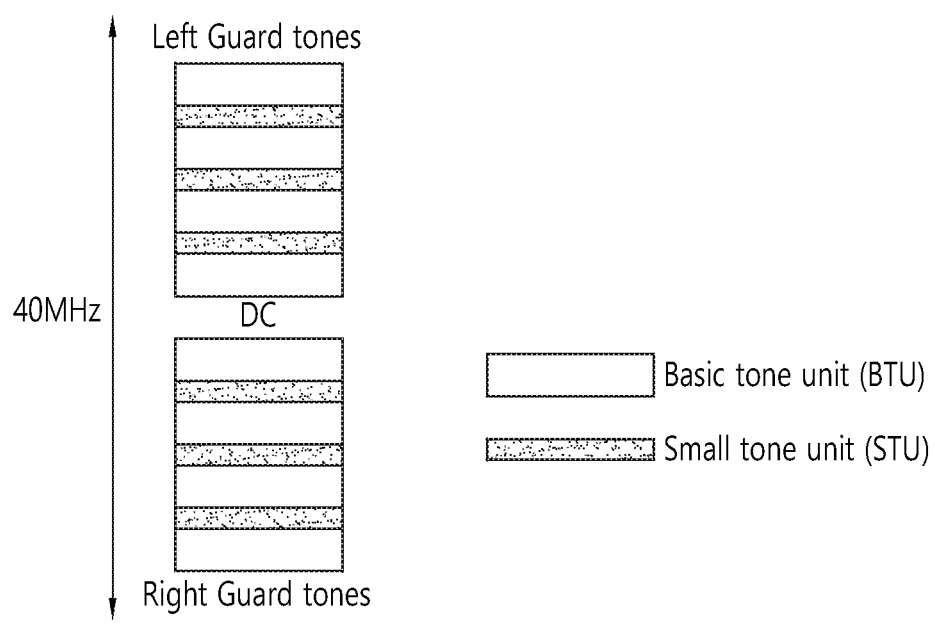
FIG. 9 is a conceptual diagram illustrating a method of allocating a resource according to an embodiment of the present invention.

FIG. 9 is a conceptual diagram illustrating a method of allocating a resource according to an embodiment of the present invention.

FIG. 9 discloses resource allocation for 512 tones of 40 MHz bandwidth.

Referring to FIG. 9, BTU may be a resource unit corresponding to 56 tones, and STU may be a resource unit corresponding to 7 tons.

In 512 tones, if 11 tones for the left guard tone and the right guard tone and 11 tones for DC tone are excepted, 490 tones may be left. 490 tones may be allocated to 8 BTUs and 6 STUs.

For example, the left guard tone, BTU1, STU1, BTU2, STU2, BTU3, STU3, BTU4, DC, BTU5, STU5, BTU6, STU6, BTU7, STU7, BTU8, and the right guard tone may be located on 40 MHz bandwidth.

When the resource allocation into one STA is performed on 40 MHz bandwidth, the STA may operate on the basis of the existing numerology of 484 tones (two times of 242 tons). Namely, STA may operate based on the virtual allocation resource unit without considering resource allocation such as BTU and STU.

When resource allocation into 2 STAs is performed on 40 MHz, 8 BTUs may be allocated to one STA, and 6 STUs may be allocated to the other STA.

When the resource allocation into 3 STAs is performed on 40 MHz bandwidth, 4 BTUs may be allocated to one STA, 4 BTUs may be allocated to another STA, and 6 STUs may be allocate to the remaining one STA.

The resource allocation into the maximum 11 STAs may be performed on 40 MHz bandwidth.

As described above, one BTU may be divided into a plurality of STUs, and the plurality of divided STUs may be used for resource allocation.

In regards to BTU, the interleaving which uses the existing interleaver of 52 size may be performed, and in regards to STU, the interleaving which uses the interleaver of 12 size may be performed for 14 tones (12 data tones and 2 pilot tones) generated by the combination of two STUs.

Figure 10:
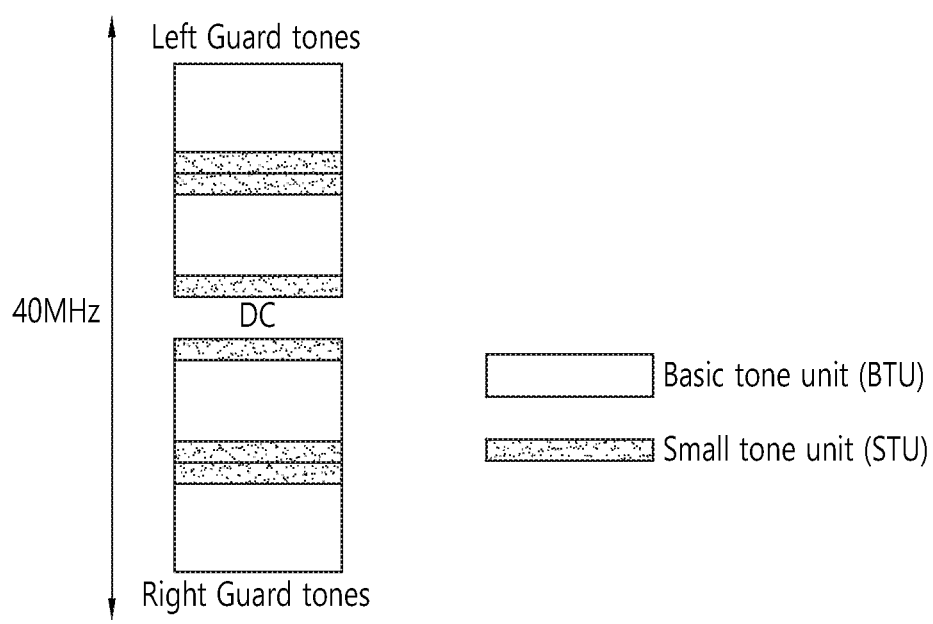
FIG. 10 is a conceptual diagram illustrating a method of allocating a resource according to an embodiment of the present invention.

FIG. 10 is a conceptual diagram illustrating a method of allocating a resource according to an embodiment of the present invention.

FIG. 10 discloses resource allocation for 512 tones of 40 MHz.

Referring to FIG. 10, BTU may be a resource unit corresponding to 56 tones and STU may be a resource unit corresponding to 7 tones.

In 512 tones, if 11 tones for the left guard tone and the right guard tone and 3 tones for DC tone are excepted, 498 tones may be left. 498 tones may be allocated to 4 BTUs and 6 STUs.

For example, the left guard tone, BTU1, STU1, STU2, BTU2, STU3, DC, STU4, BTU3, STU5, STU6, BTU4, and the right guard tone may be located on 40 MHz bandwidth.

When the resource allocation into one STA is performed on 40 MHz bandwidth, the STA may operate on the basis of the existing numerology of 484 tones (two times of 242 tones). Namely, STA may operate based on the virtual allocation resource unit of 484 tones without considering resource allocation such as BTU and STU. Alternatively, STA may operate by being allocated 4 BTUs and 6 STUs.

When the resource allocation into 2 STAs is performed on 40 MHz bandwidth, 4 BTUs may be allocated to one STA, and 6 STUs may be allocated to the other STA.

When the resource allocation into 3 STAs is performed on 40 MHz bandwidth, 2 BTUs may be allocated to one STA, and 2 BTUs may be allocated to another STA, and 6 STUs may be allocated to the remaining one STA. Further, when the resource allocation into 3 STAs is performed on 40 MHz bandwidth, 4 BTUs may be allocated to one STA, 4 STUs may be allocated to another STA, and 2 STUs may be allocated to the remaining one STA.

The resource allocation to the maximum 7 STAs may be performed on 40 MHz bandwidth.

As described above, one BTU may be divided into a plurality of STUs, and the plurality of divided STUs may be used for resource allocation.

In regards to BTU, the interleaving which uses the existing interleaver of 108 size may be performed, and in regards to STU, the interleaving which uses the interleaver of 12 size may be performed for 14 tones (12 data tones and 2 pilot tones) generated by the combination of 2 STUs.

Figure 11:
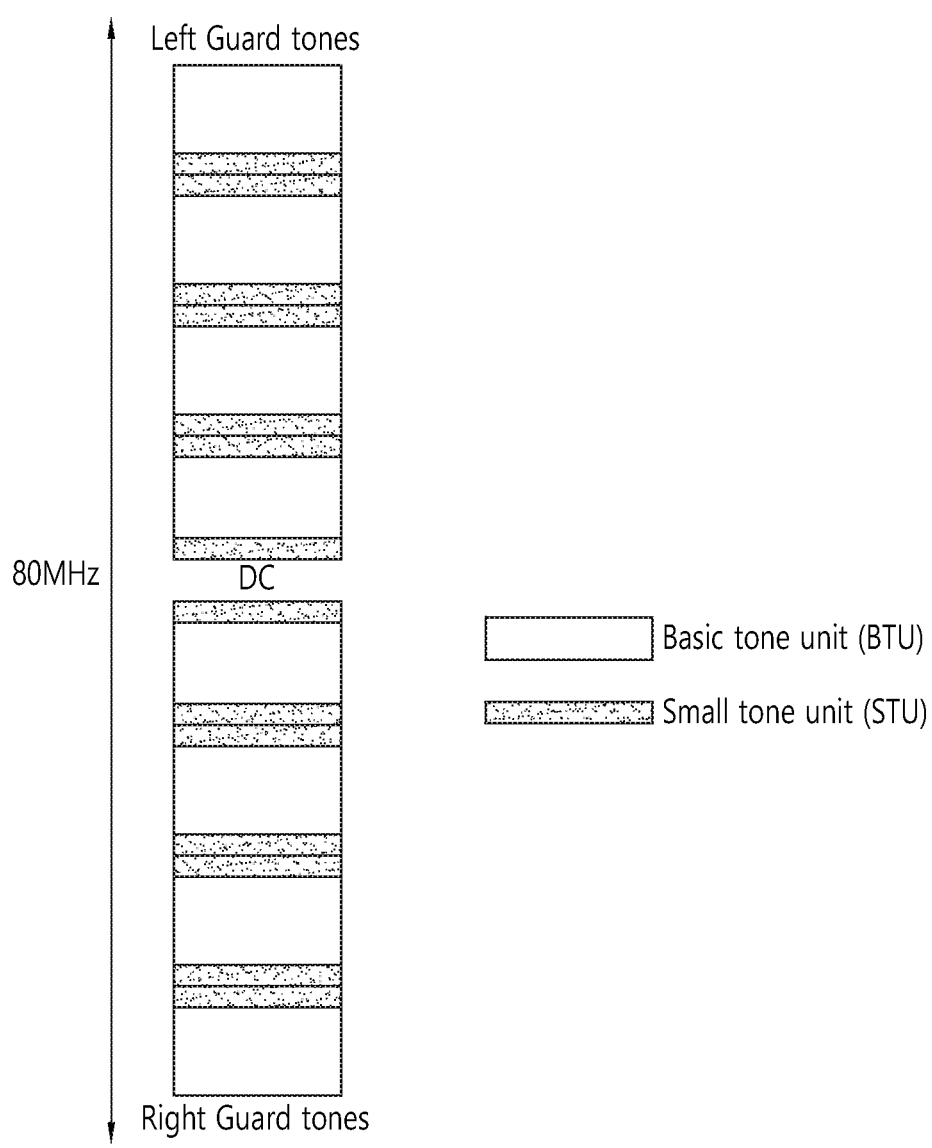
FIG. 11 is a conceptual diagram illustrating a method of allocating a resource according to an embodiment of the present invention.

FIG. 11 is a conceptual diagram illustrating a method of allocating a resource according to an embodiment of the present invention.

FIG. 11 discloses resource allocation for 1024 tones of 80 MHz bandwidth.

Referring to FIG. 11, BTU may be a resource unit corresponding to 114 tones, and STU may be a resource unit corresponding to 7 tones.

In 1024 tones, if 11 tones for the left guard tone and the right guard tone and 3 tones for DC tone are excepted, 1010 tones may be left. 1010 tones may be allocated to 8 BTUs and 14 STUs.

For example, the left guard tone, BTU1, STU1, STU2, BTU2, STU3, STU4, BTU3, STU5, STU6, BTU4, STU7, DC, STU8, BTU5, STU9, STU10, BTU6, STU11, STU12, BTU7, STU13, STU14, BTU8, and the right guard tone may be allocated on 80 MHz bandwidth.

When the resource allocation into one STA is performed on 80 MHz bandwidth, STA may operate on the basis of the existing numerology of 968 tones (two times of 484 tones). Namely, STA may operate based on the virtual allocation resource unit of 968 tones without considering the resource allocation such as BTU and STU. Further, one STA may operate by being allocated 8 BTUs and 14 STUs.

When the resource allocation into 2 STAs is performed on 80 MHz bandwidth, 8 BTUs may be allocated to one STA, and 14 STUs may be allocated into the remaining on STA.

When the resource allocation into 3 STAs is performed on 80 MHz bandwidth, 4 BTUs may be allocated to one STA, 4 BTUs may be allocated to another STA, and 14 STUs may be allocated to the remaining on STA. Further, when the resource allocation into 3 STAs is performed on 80 MHz bandwidth, 8 BTUs may be allocated into one STA, 12 STUs may be allocated into another STA, and 2 STUs may be allocated to the remaining STA.

The resource allocation into the maximum 15 STAs may be performed on 80 MHz bandwidth.

As described above, one BTU may be divided into a plurality of STUs, and the plurality of divided STUs may be used for resource allocation.

In regards to BTU, the interleaving which uses the existing interleaver of 108 size may be performed, and the interleaving which uses the interleaver of 12 size may be performed for 14 tones (12 data tones and 2 pilot tones) generated by the combination of two STUs.

Figure 12:
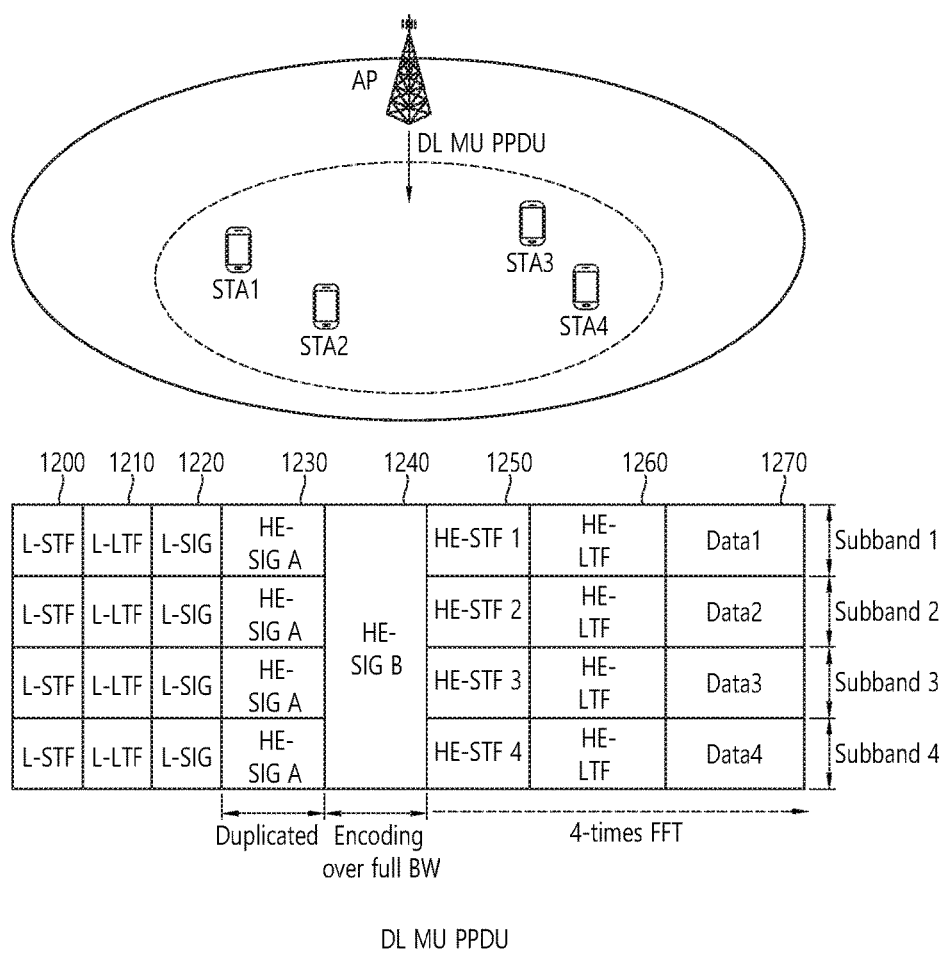
FIG. 12 is a conceptual diagram illustrating a DL MU PPDU format according to an embodiment of the present invention.

FIG. 12 is a conceptual diagram illustrating a DL MU PPDU format according to an embodiment of the present invention.

FIG. 12 discloses a DL MU PPDU format which is transmitted based on OFDMA by AP according to an embodiment of the present invention.

Referring to FIG. 12, the PPDU header of the DL MU PPDU may include L-STF (legacy-short training field), L-LTF (legacy-long training field), L-SIG (legacy-signal), HE-SIG A (high efficiency-signal A), HE-SIG B (high efficiency-signal-B), HE-STF (high efficiency-short training field), HE-LTF (high efficiency-long training field), and data field (or MAC payload). From PHY head to L-SIG may be called a legacy part, and the part after L-SIG may be called a HE (high efficiency) part.

L-SFT 1200 may include a short training orthogonal frequency division multiplexing (OFDM) symbol. L-STF 1200 may be used for frame detection, AGC (automatic gain control), diversity detection, and coarse frequency/time synchronization.

L-LTF 1210 may include a long training orthogonal frequency division multiplexing (OFDM) symbol. The L-LTF 1210 may be used for fine frequency/time synchronization and channel prediction.

L-SIG 1220 may be used to transmit control information. L-SIG 1220 may include information on the data transmission rate and the data length.

HE-SIG A 1230 may include information for indicating STA for receiving DL MU PPDU. For example, HE-SIG A 1230 may include information for indicating the identifier of a specific STA (or AP) to be received and the group of a specific STA. Further, when DL MU PPDU is transmitted based on OFDMA or MIMO, HE-SIG A 1230 may include resource allocation information for STA's reception of DL MU PPDU.

Further, HE-SIG A 1230 HE-SIG A 1230 may include color bits information for BSS identification information, bandwidth information, tail bit, CRC bit, MSC (modulation and coding scheme) information for HE-SIG B 1240, symbol number information for HE-SIG B 1240, and CP (cyclic prefix) (or GI (guard interval)) length information.

HE-SIG B 1240 may include information on the length MCS of PSDU (physical layer service data unit) for each STA and tail bit. Further, HE-SIG B 1240 may include information on STA for receiving PPDU and resource allocation information (or MU-MIMO information) based on OFDMA. When OFDMA-based resource allocation information (or MU-MIMO-related information) is included in HE-SIG B 1240, the resource allocation information may not be included in HE-SIG A 1230.

As described above, HE-SIG A 1230 or HE-SIG B 1240 may include information on the allocation on the allocation and division of the resource (e.g., information on the configuration of the basic resource allocation unit) and information on the allocation of each of the plurality of divided basic resource allocation units into a plurality of STAs (individual STA allocation information).

The previous field of HE-SIG B 1240 may be transmitted on DL MU PPDU in a form that is duplicated in each of different transmission resources. In the case of HE-SIG B 1240, HE-SIG B 1240 transmitted in some sub-channels (e.g., sub-channel 1 and sub-channel 2) is an independent field including individual information, and HE-SIG B 1240 transmitted on the remaining sub-channels (e.g., sub-channel 3 and sub-channel 4) may be a format which has duplicated HE-SIG B 1240 transmitted on another sub-channel (e.g., sub-channel 1 and sub-channel 2). Further, HE-SIG B 1240 may be transmitted on the entire transmission resource in an encoded form. The field after HE-SIG B 1240 may include individual information for each of a plurality of STAs receiving PPDU.

HE-STF 1250 may be used to improve automatic gain control estimation in a MIMO (multiple input multiple output) environment or OFDMA environment.

Specifically, STA1 may receive HE-STF1 which is transmitted through sub-band 1 from AP and perform synchronization, channel tracking/prediction, and AGC so as to decode data field 1. Likewise, STA2 may receive HE-STF2 transmitted from AP through sub-band 2 and decode data field 2 by performing synchronization, channel tracking/prediction, and AGC. STA3 may receive HE-STF3 transmitted from AP through sub-band 3 and decode data field 3 by performing synchronization, channel tracking/prediction and AGC. STA4 may receive HE-STF4 from AP through sub-band 4 and decode data field 4 by performing synchronization, channel tracking/prediction, and AGC.

HE-LTE 1260 may be used to estimate the channel in MIMO environment or OFDMA environment.

The size of IFFT applied to HE-SFT 1250 and the field after HE-STF 1250 may be different from the size of IFFT applied to the field before HE-STF 1250. For example, the size of IFFT applied to HE-SFT 1250 and the field after HE-STF 1250 may be greater than the HE-SFT 1250 and the field after HE-STF 1250 by 4 times. STA may receive HE-SIG A 1230 and may be directed to receive DL PPDU based on the HE-SIG A 1230. In such a case, STA may perform a decoding based on the FFT size which has been changed from HE-STF 1250 and the field after HE-STF 1250. On the contrary, when the STA is not directed to receive DL PPDU based on HE-SIG A1230, the STA may stop decoding and set NAV (network allocation vector). The CP (cyclic prefix) of HE-STF 1250 may have a size greater than the CP of another field, and during such a CP section, STA may perform a decoding for the DL PPDU by changing FFT size.

AP (access point) may allocate each of a plurality of wireless resources for each of the plurality of STAs (stations) on the entire bandwidth and transmit PPDU (physical protocol data unit) to each of the plurality of STAs through each of the plurality of wireless resources.

At this time, each of the plurality of wireless resources may be a combination of a plurality of wireless resource units defined as different sizes on the frequency axis. As described above, the resource allocation combination may be the combination of at least one resource units which may be allocated on the entire available tones according to the size of the bandwidth. At this time, the entire available tones may be a multiple of 242 tones according to the size of the bandwidth.

When the size of the bandwidth is 20 MHz, the entire available number of tones may be 242, and when the size of the bandwidth is 40 MHz, the entire available number of tones may be 484.

For example, as described above, the resource allocation combination may be as follows.

When the size of the bandwidth is 20 MHz and the size of the first resource unit among at least one resource unit is 26 tones, the resource allocation combination may include the 9 first resource units allocated on 20 MHz.

When the size of the bandwidth is 20 MHz and the size of the second resource unit among at least one resource unit is 242 tones, the resource allocation unit may include the 1 second resource unit allocated on 20 MHz.

When the size of the bandwidth is 40 MHz and the size of the third resource unit among at least one allocatable resource unit is 484 tones, the resource allocation combination may include the 1 third resource unit allocated on 40 MHz.

Figure 13:
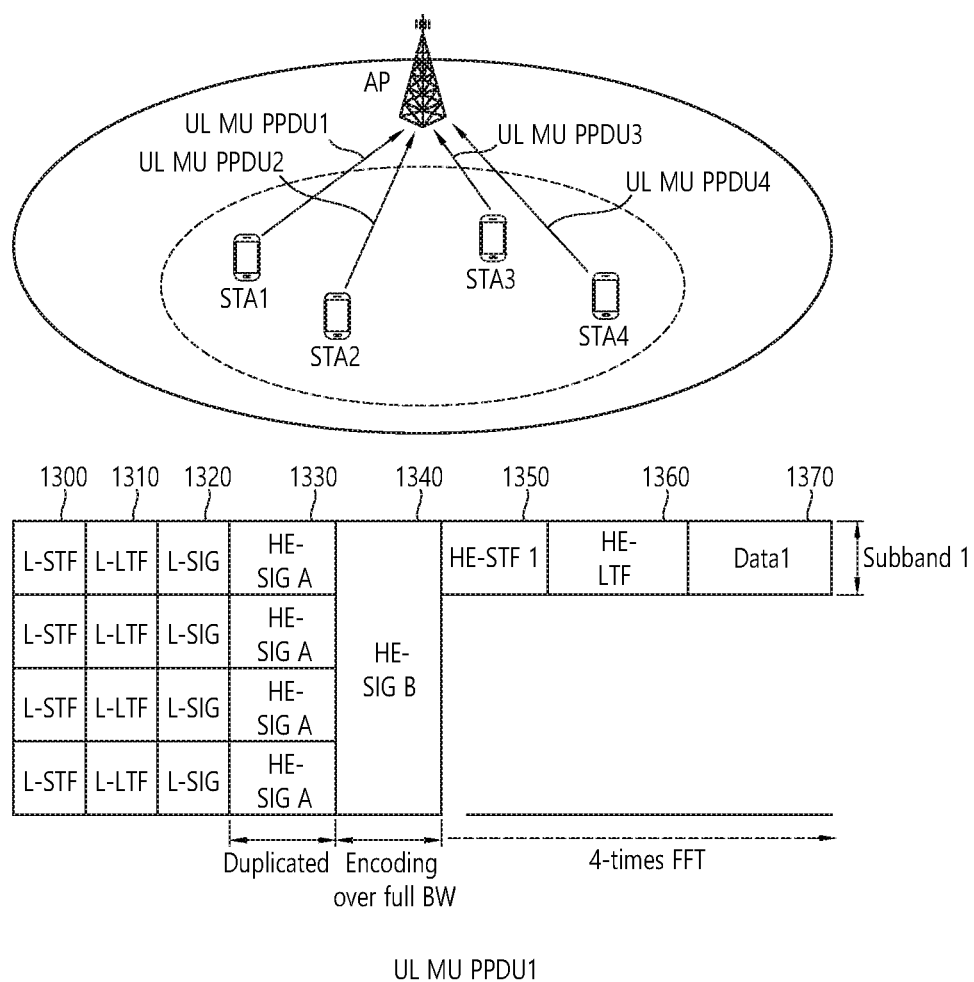
FIG. 13 is a conceptual diagram illustrating transmission of a UL MU PPDU according to an embodiment of the present invention.

FIG. 13 is a conceptual diagram illustrating transmission of a UL MU PPDU according to an embodiment of the present invention.

Referring to FIG. 13, a plurality of STAs may transmit UL MU PPDU by AP based on UL MU OFDMA.

L-SFT 1300, L-LTF 1310, L-SIG 1320, HE-SIG A 1330, and HE-SIG B 1340 may play the role disclosed in FIG. 12. Information included in the signal fields (L-SIG 1320, HE-SIG A 1330, and HE-SIG B 1340) may be generated based on information included in the signal field of the received DL MU PPDU.

STA1 may perform UL transmission through the entire bandwidth up to HE-SIG B 1340 and then perform UL transmission through the allocated bandwidth from after HE-STF 1350. STA1 may transmit UL frame through the allocated bandwidth (e.g., sub-band 1) based on UL MU PPDU.

Figure 14:
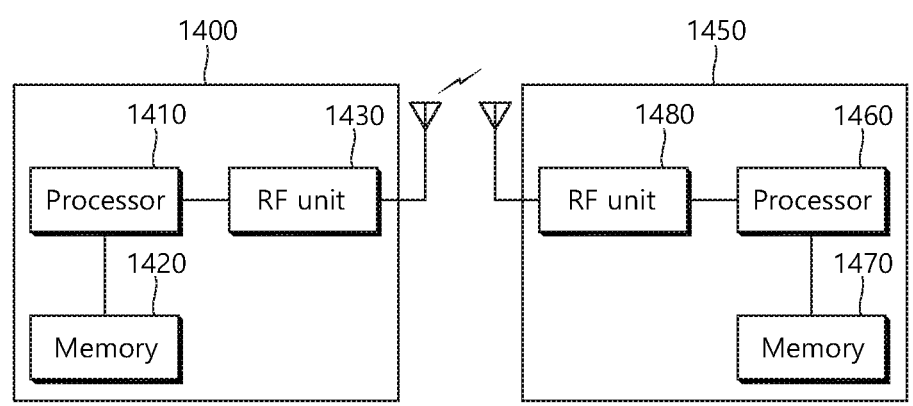
FIG. 14 is a block diagram illustrating a wireless apparatus to which an embodiment of the present invention may be applicable.

FIG. 14 is a block diagram illustrating a wireless apparatus to which an embodiment of the present invention may be applicable.

Referring to FIG. 14, a wireless apparatus 1400 is a STA capable of implementing the above-described embodiment and may be an AP 1400 or a non-AP STA 1450.

The AP 1400 includes a processor 1410, a memory 1420, and a radio frequency (RF) unit 1430.

The RF unit 1430 may be connected to the processor 1410 and transmit/receive a wireless signal.

The processor 1410 may implement a function, process, and/or method proposed in the present invention. For example, the processor 1410 may be implemented to perform an operation of the AP according to the above-described embodiments of the present invention. The processor may perform the operation of the AP disclosed in the embodiments of FIGS. 1 to 13.

For example, the processor 1410 may be implemented to schedule a wireless resource for communication with the STA on the bandwidth and transmit DL data to the STA through a wireless resource. The wireless resource may be determined based on the resource allocation combination according to the size of the bandwidth, the resource allocation combination may be the combination of at least one resource unit which may be allocated on the entire tones according to the size of the bandwidth, and the entire available tone may be a multiple of 242 tones according to the size of the bandwidth.

When the size of the bandwidth is 20 MHz, the number of the entire available tones may be 242, and when the size of the bandwidth is 40 MHz, the total number of tones may be 484.

When the size of the bandwidth is 20 MHz and the size of the first resource unit among at least one resource unit is 26 tones, the resource allocation combination may include the 9 first resource units allocated on 20 MHz. Further, when the size of the bandwidth is 20 MHz and the size of the second resource unit among at least one resource unit is 242 tones, the resource allocation combination may include 1 second resource unit allocated on 20 MHz.

When the size of the bandwidth is 40 MHz and the size of the third resource unit among at least one allocable resource unit is 484 tones, the resource allocation combination may indicate the 1 third resource unit allocated on 40 MHz.

STA 1450 includes a processor 1460, a memory 1470, and a radio frequency (RF) unit 1480.

The RF unit 1480 may be connected to the processor 1460 and transmit/receive a wireless signal.

The processor 1460 may implement a function/process and/or method proposed in the present invention. For example, the processor 1460 may be implemented to perform the operation of STA according to the above-described embodiments of the present invention. The processor may perform the operation of the STA in the embodiments of FIGS. 1 to 13.

For example, the processor 1460 may be implemented to receive DL data based on the DL resource unit allocated based on the resource allocation combination. Further, the processor 1460 may be implemented to transmit UL data based on UL resource unit allocated based on the resource allocation combination.

The processors 1410 and 1460 may include an application-specific integrated circuit (ASIC), a different chipset, a logical circuit, a data processing device, and/or a converter for converting a baseband into a wireless signal or vice versa. The memories 1420 and 1470 may include a read-only memory (ROM), a random access memory (RAM), a flash memory, a memory card, a storage medium, and/or another storage device. The memories 1420 and 1470 may include a read-only memory (ROM), a random access memory (RAM), a flash memory, a memory card, a storage medium and/or another storage device. The RF units 1430 and 1480 may include one or more antennas for transmitting and/or receiving a wireless signal.

When embodiments are implemented as software, the above-described scheme may be implemented as a module (process, function, etc.) for performing the above-descried function. The module may be stored in the memories 1420 and 1470 and executed by the processors 1410 and 1460. The memories 1420 and 1470 may be mounted inside or outside the processors 1410 and 1460 and may be connected to the processors 1410 and 1460 as various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for downlink transmission in a wireless Local Area Network (LAN), the method comprising:
    generating, by an access point (AP), a physical layer protocol data unit (PPDU) for a frequency band,
    wherein the PPDU includes a signal (SIG) field and a data field; and
    transmitting, by the AP, the PPDU based on a wireless resource,
    wherein the wireless resource includes first 242 tones and second 242 tones,
    wherein the first and second 242 tones are allocated based on orthogonal frequency division multiple access (OFDMA),
    wherein a total number of tones included in the wireless resource is set based on a size of the frequency band,
    wherein the first 242 tones in the wireless resource is allocated as 1 first type resource unit (RU) or 9 second type RUs,
    wherein the second 242 tones in the wireless resource is allocated as 1 first type RU or 9 second type RUs,
    wherein the SIG field includes control information related to allocation of RUs,
    wherein the control information is configured based on the first 242 tones or the second 242 tones,
    wherein the control information includes a first N bit field used for the first 242 tones and a second N bit field used for the second 242 tones,
    wherein each first type RU is allocated with tones, and
    wherein each second type RU is allocated with 26 tones.

2. The method of claim 1, wherein the frequency band is a 40 MHz band, and the number of 484.

3. The method of claim 1, wherein, when the first 242 tones in the wireless resource is allocated as the 9 second type RUs, 8 remaining tones among the first 242 tones are leftover tones, which are used for user allocation separation, or guard tones.

4. An access point (AP) for allocating a wireless resource in a wireless Local Area Network (LAN), the AP comprising:
    a transceiver configured to transmit a downlink signal; and
    a processor configured to control the transceiver,
    wherein the processor is further configured to:
        generate a physical layer protocol data unit (PPDU) for a frequency band,
        wherein the PPDU includes a signal (SIG) field and a data field,
        transmit, via the transceiver, the PPDU based on a wireless resource,
        wherein the wireless resource includes first 242 tones and second 242 tones,
        wherein the first and second 242 tones are allocated based on orthogonal frequency division multiple access (OFDMA),
        wherein a total number of tones included in the wireless resource is set based on a size of the frequency band,
        wherein the first 242 tones in the wireless resource is allocated as 1 first type resource unit (RU) or 9 second type RUs,
        wherein the second 242 tones in the wireless resource is allocated as 1 first type RU or 9 second type RUs,
        wherein the SIG field includes control information related to allocation of RUs,
        wherein the control information is configured based on the first 242 tones or the second 242 tones, wherein the control information includes a first N bit field used for the first 242 tones and a second N bit field used for the second 242 tones, wherein each first type RU is allocated with 242 tones, and wherein each second type RU is allocated with 26 tones.

5. The AP of claim 4, wherein the frequency band is a 40 MHz band, and the total number of tones is set to 484.

6. The AP of claim 4, wherein, when the first 242 tones in the wireless resource is allocated as the 9 second type RUs, 8 remaining tones among the 242 tones are leftover tones, which are used for user allocation separation, or guard tones.

7. A method for downlink reception in a wireless Local Area Network (LAN), the method comprising:

receiving, by a station (STA), a physical layer protocol data unit (PPDU) on a frequency band, wherein the PPDU includes a signal (SIG) field and a data field; and decoding, by the STA, the PPDU based on a wireless resource, wherein the wireless resource includes first 242 tones and second 242 tones, wherein the first and second 242 tones are allocated based on orthogonal frequency division multiple access (OFDMA), wherein a total number of tones included in the wireless resource is set based on a size of the frequency band, wherein the first 242 tones in the wireless resource is allocated as 1 first type resource unit (RU) or 9 second type RUs, wherein the second 242 tones in the wireless resource is allocated as 1 first type RU or 9 second type RUs, wherein the SIG field includes control information related to allocation of RUs, wherein the control information is configured in a unit of 242 tones.

8. The method of claim 7, wherein the frequency band is a 40 MHz band, and the total number of tones is set to 484.

9. The method of claim 7, wherein, when the first 242 tones in the wireless resource is allocated as the 9 second type RUs, 8 remaining tones among the 242 tones are leftover tones, which are used for user allocation separation, or guard tones.

* * * * *